(12) United States Patent
Jowett

(10) Patent No.: US 10,884,911 B2
(45) Date of Patent: Jan. 5, 2021

(54) SYSTEM AND METHOD FOR USE IN REGRESSION TESTING OF ELECTRONIC DOCUMENT HYPERLINKS

(71) Applicant: LENS10 PTY LTD, Cremorne (AU)

(72) Inventor: Robin Eric Nicholas Jowett, Glen Iris (AU)

(73) Assignee: LENS10 PTY LTD, Cremorne (AU)

(*) Notice: Subject to any disclaimer, the term of this patent is extended or adjusted under 35 U.S.C. 154(b) by 40 days.

(21) Appl. No.: 15/736,946

(22) PCT Filed: Jun. 14, 2016

(86) PCT No.: PCT/AU2016/050484
§ 371 (c)(1),
(2) Date: Dec. 15, 2017

(87) PCT Pub. No.: WO2016/201495
PCT Pub. Date: Dec. 22, 2016

(65) Prior Publication Data
US 2018/0189171 A1    Jul. 5, 2018

(30) Foreign Application Priority Data
Jun. 15, 2015 (AU) ............................... 2015902272

(51) Int. Cl.
*G06F 11/00* (2006.01)
*G06F 11/36* (2006.01)
*G06F 16/955* (2019.01)

(52) U.S. Cl.
CPC ...... *G06F 11/3692* (2013.01); *G06F 11/3664* (2013.01); *G06F 11/3684* (2013.01); *G06F 11/3688* (2013.01); *G06F 16/9566* (2019.01)

(58) Field of Classification Search
CPC ............. G06F 11/3664; G06F 11/3684; G06F 11/3688; G06F 11/3692
See application file for complete search history.

(56) References Cited

U.S. PATENT DOCUMENTS 6,185,701 B1 * 2/2001 Marullo ................ G06F 16/958
714/38.14
7,512,039 B1 * 3/2009 Voruganti ........... G06F 11/3688
368/10

(Continued)

FOREIGN PATENT DOCUMENTS

EP    2012019639 A1    2/2012

OTHER PUBLICATIONS

Supplementary European Search Report, dated Jan. 31, 2019 in corresponding European Patent Application EP 16 81 0607.

*Primary Examiner* — Joshua P Lottich
(74) *Attorney, Agent, or Firm* — Galgano IP Law PLLC; Thomas M. Galgano

(57) ABSTRACT

This disclosure relates to analysing an electronic document and has particular application to analysing webpages. Where the electronic document is in the form of a webpage, it is highly desirable to test the webpage to ensure the integrity of key characteristics of the webpage remain in place after changes or updates are made to the webpage, such as user click through links and analytic tags and to ensure that any changes to a webpage do not result in broken links to other pages and that analytic tags are not adversely impacted by changes to the webpage that could cause the tags to send inaccurate or incomplete analytic data to the analytics engine.

13 Claims, 34 Drawing Sheets

(56) References Cited

U.S. PATENT DOCUMENTS

| | | | |
|---|---|---|---|
| 8,185,877 B1* | 5/2012 | Colcord | G06F 9/44 |
| | | | 717/124 |
| 10,514,890 B2* | 12/2019 | Mody | G06F 11/3692 |
| 2002/0116494 A1* | 8/2002 | Kocol | G06Q 30/0257 |
| | | | 709/224 |
| 2011/0119220 A1* | 5/2011 | Seolas | G06F 17/2247 |
| | | | 706/47 |
| 2013/0173962 A1 | 7/2013 | Li et al. | |
| 2013/0212638 A1 | 8/2013 | Wilson | |
| 2014/0059522 A1* | 2/2014 | Chandra | G06F 11/3684 |
| | | | 717/126 |
| 2018/0189171 A1* | 7/2018 | Jowett | G06F 11/3664 |

* cited by examiner

FIG. 24

SYSTEM AND METHOD FOR USE IN REGRESSION TESTING OF ELECTRONIC DOCUMENT HYPERLINKS

FIELD

This disclosure relates to the field of analysing an electronic document and has particular, but by no means exclusive, application to analysing webpages.

BACKGROUND

The ability to check and test an electronic document to ensure it conforms to certain requirements is important. In the situation where the electronic document is in the form of a webpage, it is highly desirable to test the webpage to ensure the integrity of key characteristics of the webpage remain in place after changes or updates are made to the webpage. By way of example, some of the key characteristics of a webpage that may need to be retained following changes to the webpage could include user click through links and analytic tags. It is important for example that any changes to a webpage do not result in broken links to other pages. Furthermore, it is important to test that analytic tags are not adversely impacted by changes to the webpage that could cause the tags to send inaccurate or incomplete analytic data to the analytics engine.

Accordingly, there is a need to be able to test electronic documents (such as webpages) to ensure their integrity remains in place following changes to the electronic documents.

SUMMARY

In an embodiment of an electronic system, the electronic system comprises a processing arrangement that is capable of accessing:
  document test data that defines at least one document characteristic; and
  an electronic document,
wherein the processing arrangement is further arranged to process the test data and the electronic document to make a determination in relation to whether the electronic document has the at least one document characteristic.

One of the advantages that the embodiment of the electronic system provides is that it enables a user of the system to create a test that can be run at later dates to ensure the integrity of the electronic document has not been compromised following any changes that are made to the electronic document. For example, if the electronic document was in the form of a webpage, then the test can be established such that it can be used to ensure crucial user click through flows through the website remain unbroken following any changes to the website. The tests can also be used to determine whether important analytics data is being properly reported to a third party analytics engine following any changes that may be made to the website.

In the embodiment of the electronic system the processing arrangement is arranged to provide a user interface that allows a user to create the test data by interacting with the electronic document.

An advantage of the user interface is that it enables easy and rapid development of tests. For example, the user interface can be graphically driven so that the test can be established by merely interacting with the electronic document (such as a webpage) while recording the various actions that are performed while interacting with the electronic document. This means that a developer of a test need not have intimate knowledge of the language (e.g., HTML) required to otherwise build the test.

In the embodiment of the electronic system the at least one document characteristic comprises a reference to at least one other electronic document.

The advantage of the characteristic being the at least one other document is that it allows the test to check for broken links that may exist in the electronic document following any changes that are made to the electronic document.

In the embodiment of the electronic system the at least one document characteristic comprises an ability to collect certain data and facilitate sending the certain data via a data network to a data server that is remote to the electronic system.

An advantage of testing the electronic document's ability to collect data and send it to a third party server is that it enables a test to be established in relation to webpage tags, such as those used for Google Analytics, and therefore test the tags to ensure they are performing properly following any changes that are made to the electronic document.

In the embodiment of the electronic system the processing arrangement is capable of generating an electronic report about the determination in relation to whether the electronic document has the at least one document characteristic.

An advantage of generating the electronic report is that it allows the results of a test run to be readily examined by a user.

In the embodiment of the electronic system the processing arrangement is capable of further accessing schedule data that defines a schedule for processing the document test data.

An advantage of using the scheduling data is that the system can be configured to run the test without the need for a user to actually initiate the test run at the required time.

In the embodiment of the electronic system the user interface is such that it allows the user to create the schedule data.

The user interface has the advantage of allowing the test schedule to be easily and efficiently established by affording selection menus such as time, date and frequency of test runs.

In the embodiment of the electronic system the processing arrangement is capable of generating an electronic report about the determination as to whether the electronic document has the ability to collect the certain data and send it to the data server.

Being able to generate the report in relation to collecting the certain data is advantageous because it allows easy diagnosis of whether this aspect of the electronic document is functioning as required.

In the embodiment of the electronic system the processing arrangement is capable of retrieving the electronic document via a data network from a computer server that is remote to the electronic system.

Being able to retrieve the electronic document from the remote computer server is advantageous because it allows a broad range of documents to be readily accessed and tested over data networks such as the internet.

In an embodiment of a method for use by an electronic system comprising a processing arrangement, the method comprises the steps of:
  the processing arrangement accessing document test data that defines at least one document characteristic; and
  the processing arrangement processing the test data and the electronic document to make a determination in relation to whether the electronic document has the at least one document characteristic.

In the embodiment of the method it comprises the additional step of the processing arrangement providing a user interface that allows a user to create the test data by interacting with the electronic document.

In the embodiment of the method the at least one document characteristic comprises a reference to at least one other electronic document.

In the embodiment of the method the at least one document characteristic comprises an ability to collect certain data and facilitate sending the certain data via a data network to a data server that is remote to the electronic system.

In the embodiment of the method it comprises the additional step of the processing arrangement generating an electronic report about the determination in relation to whether the electronic document has the at least one document characteristic.

In the embodiment of the method it comprises the step of the processing arrangement accessing schedule data that defines a schedule for processing the document test data.

In the embodiment of the method the user interface is such that it allows the user to create the schedule data.

In the embodiment of the method it comprises the step of the processing arrangement generating an electronic report about the determination as to whether the electronic document has the ability to collect certain data.

In the embodiment of the method it comprises the step of the processing arrangement retrieving the electronic document via a data network from a computer server that is remote to the electronic system.

BRIEF DESCRIPTION OF DRAWINGS

An exemplary embodiment will now be described with reference to the accompanying drawings in which:

FIG. 24 shows a tag configuration webpage used in the electronic system of FIG. 1;

DETAILED DESCRIPTION

Figure 1:
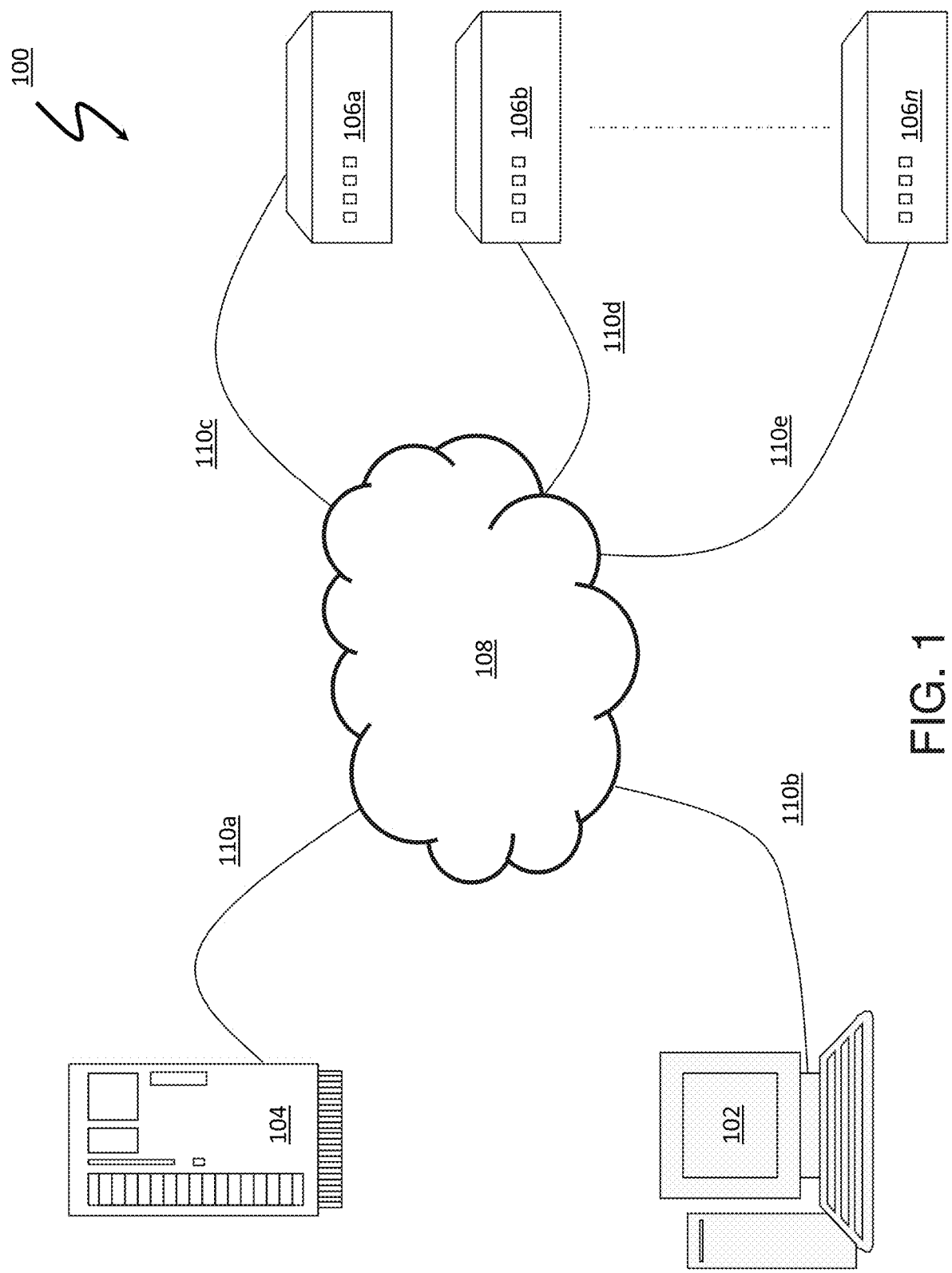
FIG. 1 provides a schematic diagram of an embodiment of an electronic system.

Referring to FIG. 1, which provides a schematic diagram of an embodiment of an electronic system 100, the system 100 comprises several key components, including: a user computer 102; an application server 104; at least one web server 106; and a data network 108. The system 100 also includes various data links 110 that connect the user computer 102, the application server 104 and the web server 106 to the data network 108 so that data can be exchanged between the user computer 102, the application server 104 and the web servers 106.

The user computer 102 is a desktop computer and in the case of this embodiment of the system 100 is in the form of an Intel based computer such as those available from, for example, Dell or HP. The user computer 102 has a hard disk (not shown in the diagrams) that contains a range of software and data. In particular, the software typically includes the Windows or OSX operating system. The hard disk also contains a web browser application such as, although not limited to, Google Chrome.

Like all desktop computers 102, the user computer 102 also comprised a keyboard, mouse and visual display device (monitor).

It is envisaged that in alternative embodiments of the system 100, different forms of the user computer 102 can be used.

The application server 104 is in the form of an Internet computer server and is an Intel based server such as that available from IBM, Dell or HP. The application server 104 has a hard disk (not shown in the figures) that contains a range of software and data. In particular, the software on the hard disk of the application server 104 includes the Linux operating system. In addition to providing the usual operating system functions, the Linux operating system also provides web server functionality. As described in more detail in subsequent paragraphs of this description, the web server functionality of the Linux operating system allows the user computer 102 to interact with the application server 104. In addition to the Linux operating system software, the hard disk of the application server 104 is also loaded with an electronic document test application. While subsequent paragraphs of this description provide a detailed description of the electronic document test application, the electronic document test application is in the form of a web based application that the user of the user computer 102 can access to test various aspects of webpages (or other electronic documents) that are accessible via any one of the web servers 106. It is envisaged that in alternative embodiments of the system 100 different forms of the application server 104 can be used.

The webservers 106 are not dissimilar to the application server 104 insofar as the web servers 106 are in the form of Internet computer servers such as that available from IBM, Dell or HP. Each web server 106 also has a hard disk (not shown in the figures) that contains various pieces of software and data. In particular, the hard disk of each web server 106 is loaded with an operating system. The operating system contains webserver functionality that allows the web servers 106 to serve up and make available various electronic documents such as HTML based webpages. To provide some context regarding the webservers 106, it is typical that each of the webservers 106 would be owned and operated by separate organisations and would typically be used to host the respective organisation's website. Such websites can be accessed by entering the web address (e.g. www.datatrue.com) into a web browser.

The data network 108 is in the form of an open TCP/IP based packet network and in this embodiment of the system 100 the data network 108 is the Internet. The primary purpose of the data network 108 is to allow the user computer 102, the application server 104 and the web servers 106 to exchange data with each other. To further facilitate the exchange of data between the user computer 102, the application server 104 and the web servers 106, each of those components are in data communication with the data network 108 by virtue of the data links 110. The data links 110 are in the form of broadband connections. In alternative embodiments of the system 100 different forms of the data network 108 can be used.

One of the key aspects of the system 100 is that it enables a user of the user computer 102 to establish one or more tests that can be executed to determine whether select webpages made available by any one or more of the web servers 106 conform to certain requirements. As mentioned previously this functionality is provided by the electronic document test application running on the application server 104. The following paragraphs of this description provide a detailed description on how the system 100 operates to allow the determination to be made in relation to whether the webpages conform to the certain requirements.

Use of the System

The first thing the user of the user computer 102 needs to do before using the system 100 to determine whether the webpages of interest conform to the certain requirements is to establish a user account on the application server 104. Establishing an account on the application server 104 can be done using one of several methods. The user can either register online at the application server 104 or alternatively the user can directly contact the operator of the application server 104. The establishment of the account on the application server 104 is something that the operator of the application server 104 is in control of. Once the appropriate user account has been established on the application server 104, the user of the user computer 102 is free to access and use the electronic document test application that operates on the application server 104. To do this, the user of the user computer 102 opens the web browser and types in the web address associated with the application server 104. In this particular embodiment the web address that is typed into the web browser is www.datatrue.com (which is a website owned and operated by the applicant of this patent application). In response to entering in the web address www-.datatrue.com, the user computer 102 establishes a data connection with the application server 104. Once the data connection is established the application server 104 sends a login page 200 (see FIG. 2) to the user computer 102.

Figure 1A:
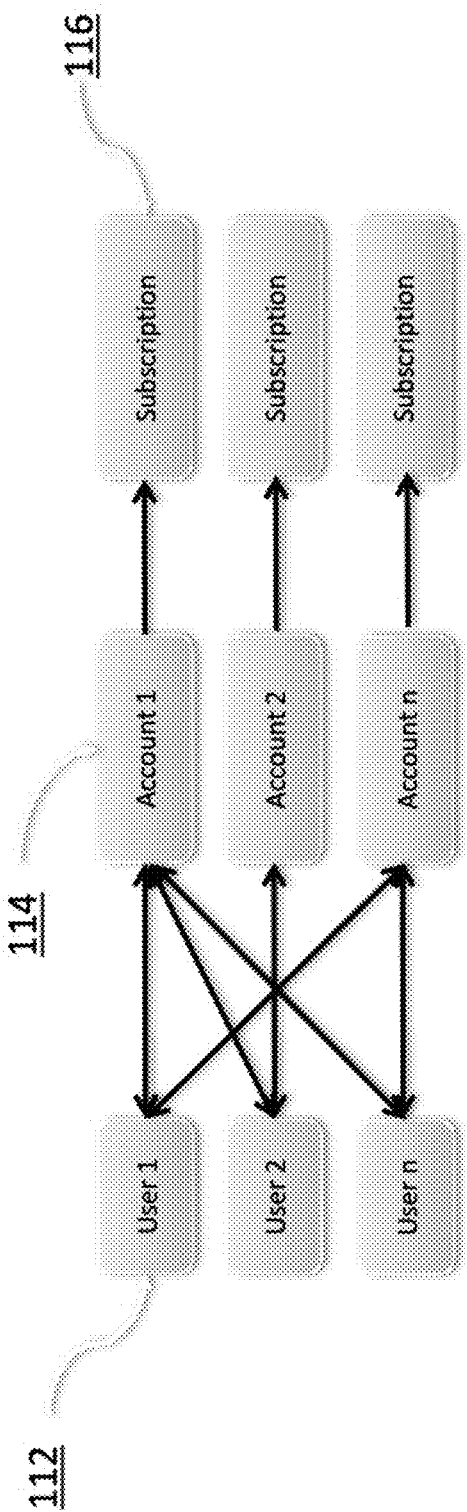
FIG. 1A shows the relationships between user logins, accounts and subscriptions used in the electronic system of FIG. 1.

FIG. 1A provides an illustration of the relationships that exist between user logins 112, accounts 114 and subscriptions 116. A user login 112 can be linked to any number of user accounts 114. Correspondingly, any number of user accounts 114 can be linked to any number of user logins 112. These relationships allow for multiple users to have access to multiple accounts. However, an account 114 can only be linked to one subscription 116.

Figure 2:
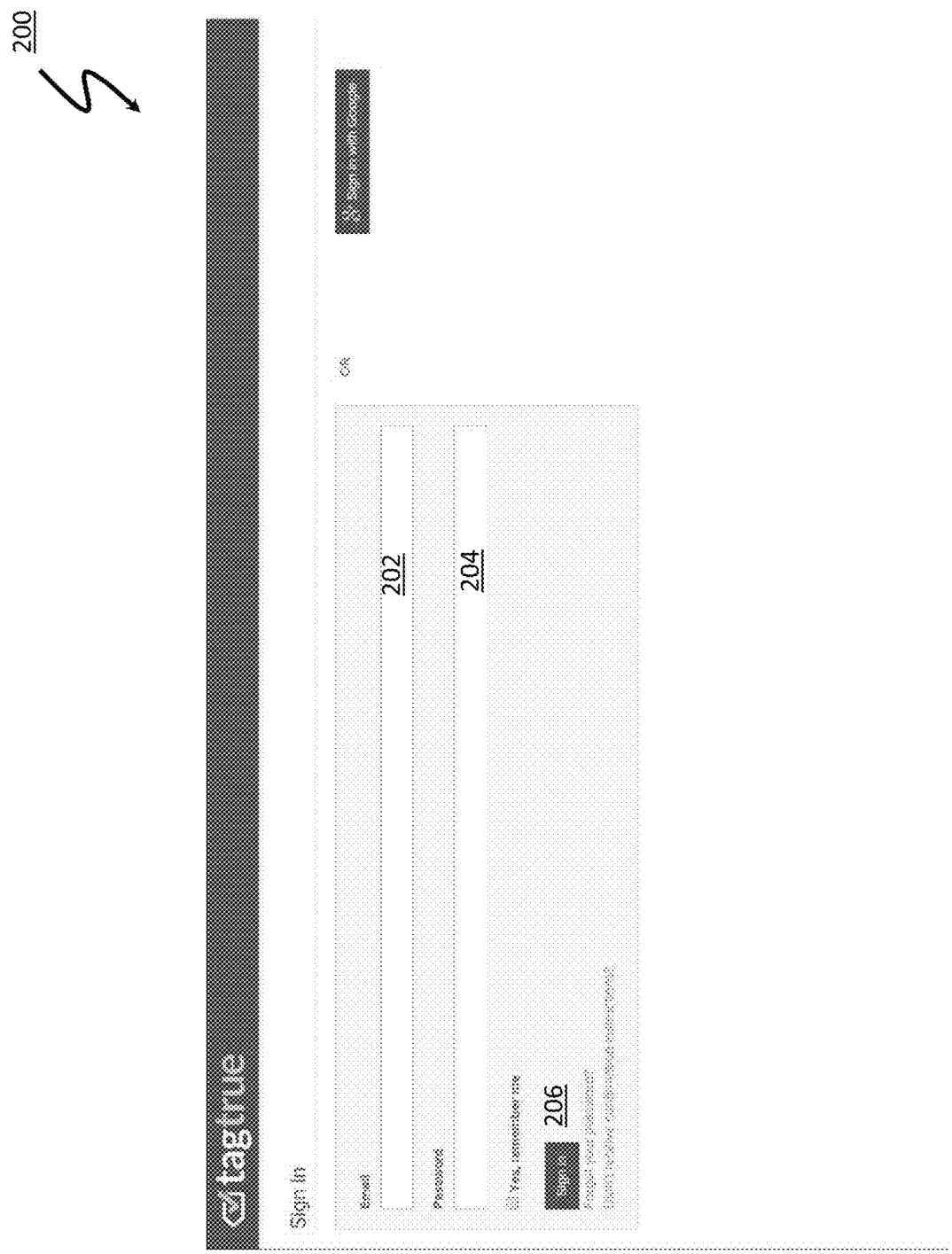
FIG. 2 shows a login webpage used in the electronic system of FIG. 1.

The login is an HTML page and is sent via the data connection, which results in the login page 200 passing over the data links 110*a* and 110*b* and the data network 108. On receiving the login page 200 the user computer 102 renders the login page 200 on the display of the user computer 102. FIG. 2 provides a depiction of the login page 200. The user of the user computer 102 can type in the login credentials in the email and password dialogue boxes 202 and 204 using the keyboard of the user computer 102. Once the user has typed in their login credentials into the dialogue boxes 202 and 204 they simply click the sign in button 206 using the mouse of the user computer 102. In response to clicking the sign in button 206 the user computer 102 sends the user's email address and password to the application computer 104 via the data links 110*a* and 110*b* and the data network 108. For security reasons, the user's email address and password are sent over the data links 110*a* and 110*b* and data network 108 in an encrypted format, which in this embodiment of the system 100 is via a HTTPS connection between the user computer 102 and the application server 104.

Figure 3:
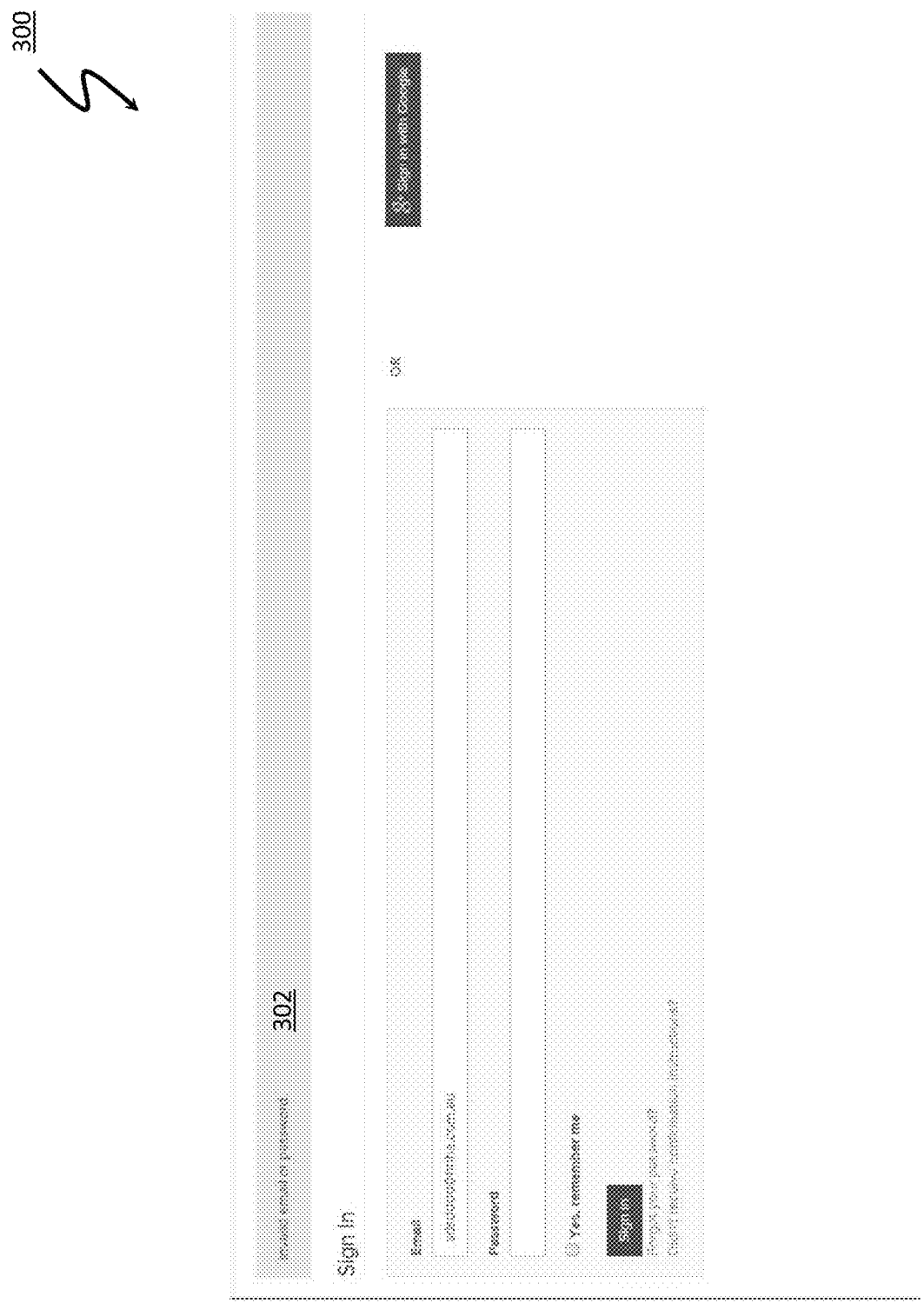
FIG. 3 shows an error message used in the electronic system of FIG. 1.

On receiving the user's login email address and password (from the user computer 102) the application server 104 first checks that the received email address and password are a valid combination. To do this the application server 104 maintains a list of all valid email addresses and password combinations on its hard disk. On receiving a login email address and password from the user computer 102 the application server 104 checks the received email address and password for a corresponding entry in the list of valid email addresses and passwords it maintains on its hard disk. If no such corresponding email address and password exists on the hard disk of the application server 104, the application server 104 flags an error message to the user of the user computer 102 by showing an error message 302 on the login page 300 (which is shown in FIG. 3). The error message 302 is displayed in the display of the user computer 102 as part of the login page 302 when it is displayed on the display of the user computer 102. The purpose of the login error message 302 is to prompt the user of the user computer 102 to re-enter their login credentials.

Figure 4:
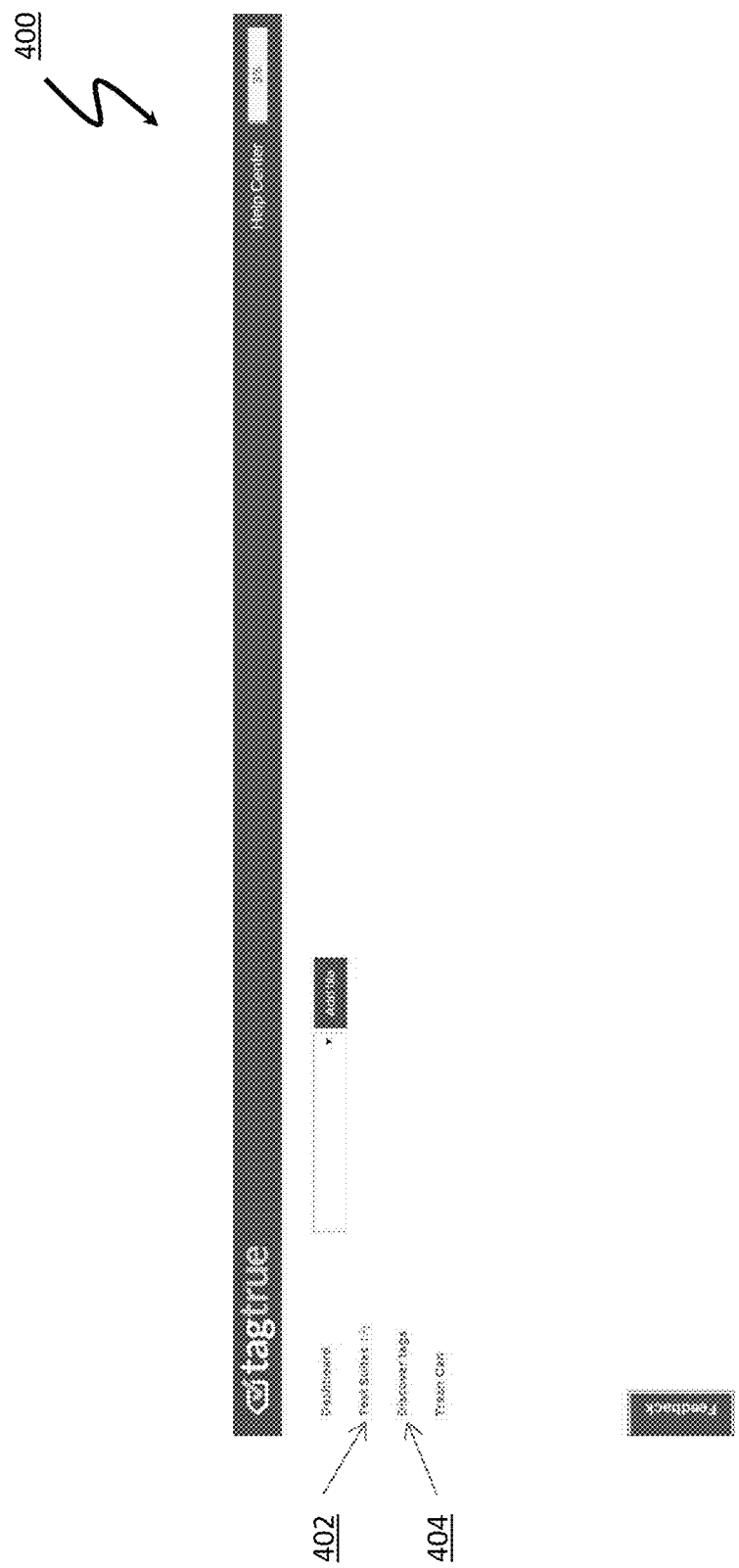
FIG. 4 shows a main account webpage used in the electronic system of FIG. 1.

In the event that the application server 104 finds a match to the received login credentials, the application server 104 generates the main account webpage 400 (see FIG. 4) and sends that webpage 400 to the user computer 102 via the data links 110a and 110b and the data network 108. On receiving the main account webpage 400 the user computer 102 renders the webpage 400 on its display so it can be viewed by the user of the user computer 102. The main account webpage 400 has two main options that can be selected by the user of the user computer 102. The two options include: the test suites option 402; and the discover tags option 404. These two options 402 and 404 are part of the primary function of the system 100, which is to allow the user of the user computer 102 to create and run tests that determine whether specific electronic documents (such as the webpages made available by the webservers 106) conform to certain characteristics.

Accordingly, the following paragraphs of this document focus on the test suite option 404 and the discover tags option 406.

The Test Suites

To select the test suites option 402, using the mouse associated with the user computer 102, the user of the user computer 102 clicks on the test suites option 402. In response to clicking on the test suites option 402, the user computer 102 sends data to the application server 104 via the data links 110a and 110b and the data network 108.

The data indicates that the test suites option 402 has been clicked on. In response to receiving this data the application server 104 generates a test suites webpage 500 and sends that webpage 500 to the user computer 102 via the data links 110a and 110b and the data network 108. On receiving the test suites webpage 500 the user computer 102 renders the webpage 500 on the display of the user computer 102 so the user can view the webpage 500.

Figure 5:
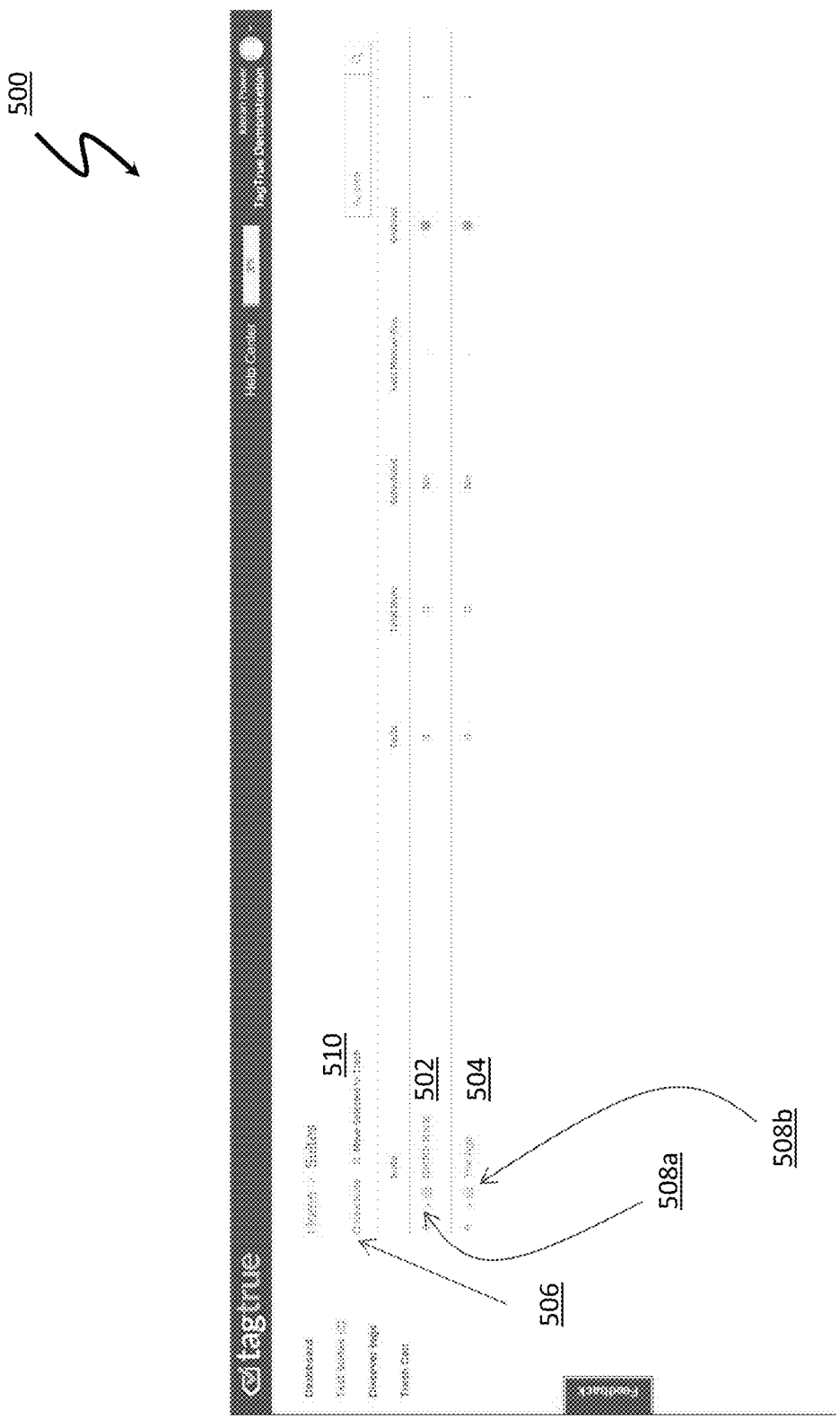
FIG. 5 shows a test suites webpage used in the electronic system of FIG. 1.

Referring to FIG. 5, the test suites webpage 500 contains a list of test suites 502 and 504 that can be executed to confirm whether the relevant electronic documents (e.g., the webpages made available by the webservers 106) conform to the various characteristics defined by the test suites 502 and 504. It is noted that while the test suites webpage 500 shows only two test suites 502 and 504, the test suites webpage 500 can identify more or less than the two test suites 502 and 504 shown in FIG. 5. The test suites 502 and 504 are not tests per se that are executed on electronic documents. Instead, each test suite 502 and 504 can be thought of as a folder that contains specific individual tests that can be executed on the relevant electronic documents. The test suites 502 and 504 are created and indeed deleted by the user of the user computer 102.

Figure 6:
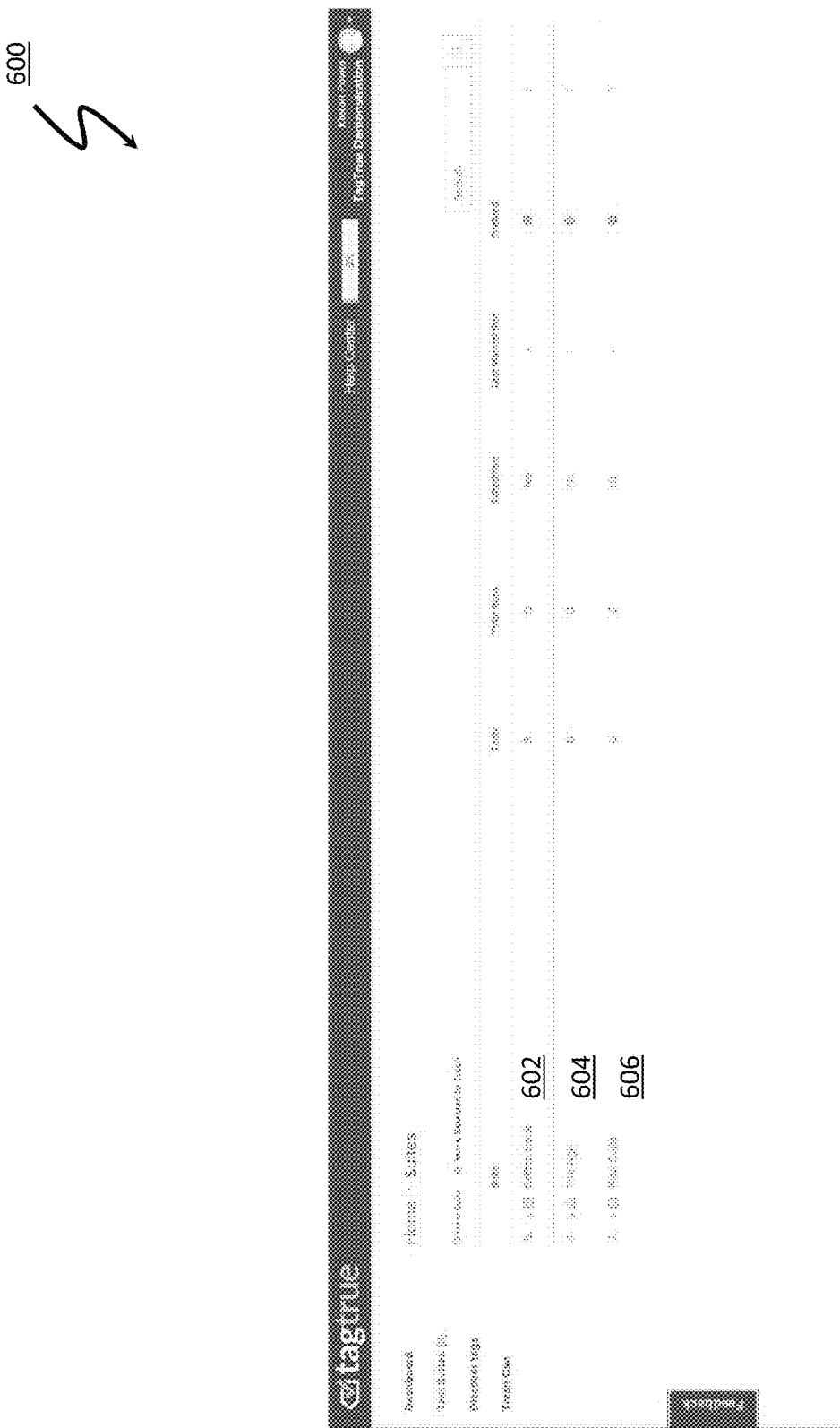
FIG. 6 shows another view of the test suites webpage of FIG. 5.
Figure 7:
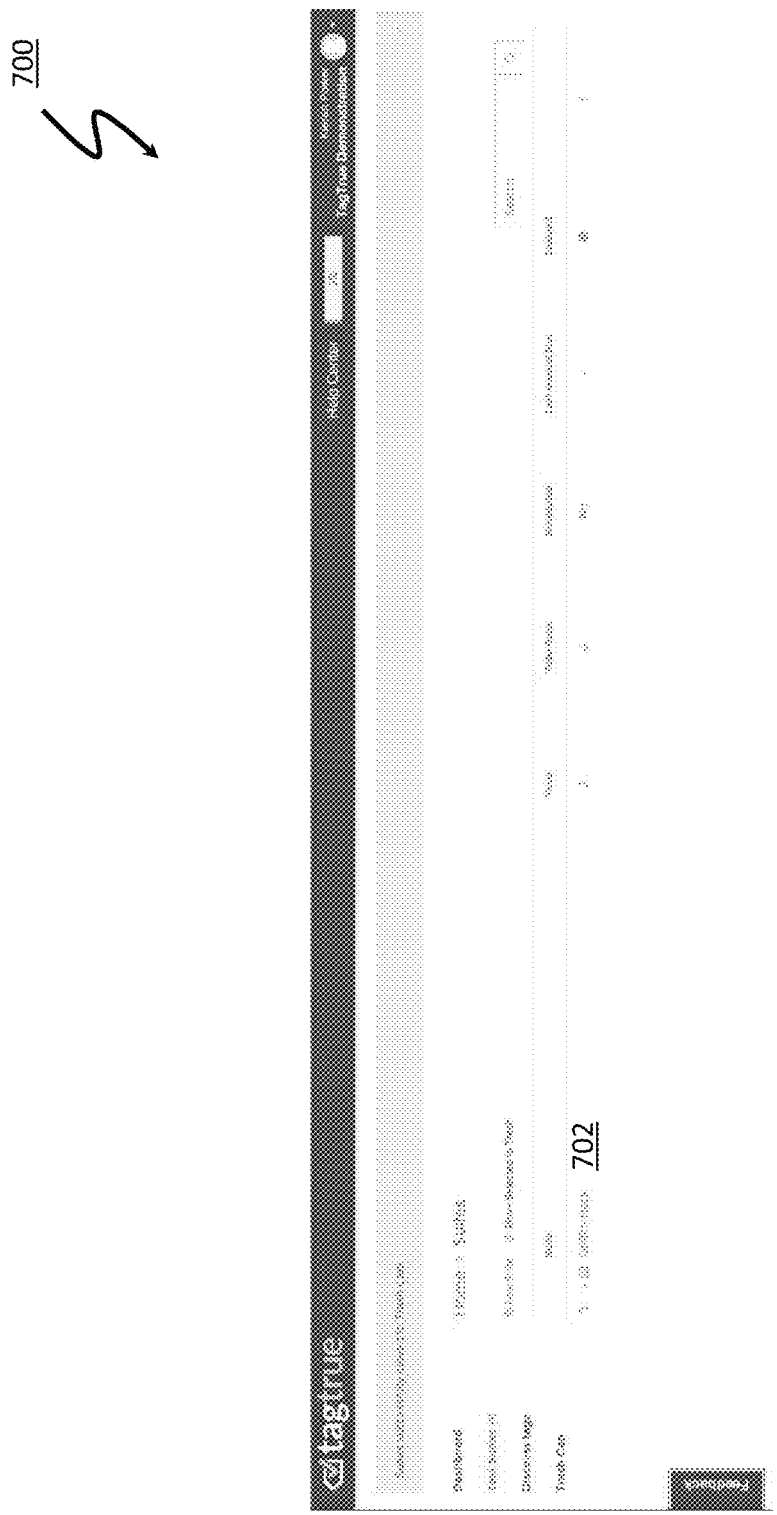
FIG. 7 shows another view of the test suites webpage of FIG. 5.

For example, to add a new test suite the user of the user computer 102 simply uses the mouse of the user computer 102 to click on the new suite option 506, while to delete a test suite 502 and 504 the user first clicks the check box 508a and 508b against the test suite 502 and 504 they wish to delete and then the user clicks on the move selected to trash option 510. FIG. 6 shows the test suites webpage 600 with a new test suite 606 added, while FIG. 7 shows the test suites webpage 700 with one of existing suites 604 (see FIG. 6) deleted.

To view the specific tests in any of the suites 502 and 504 identified in the test suites webpage 500, the user of the user computer 102 uses the mouse of the user computer 102 to click on the desired test suite 502 and 504. In response to the user of the user computer 102 clicking on one of the test suites 502 and 504 the application server 104 generates a test list webpage 800 for the test suite 502 and 504 that was clicked on. Once generated, the application server 104 sends the test list webpage 800 to the user computer 102 via the data links 110a and 110b and the data network 108. On receiving the test link webpage 800 the user computer 102 renders the webpage 800 on the display of the user computer 102 so a user can view the webpage 800.

The Tests

Figure 8:
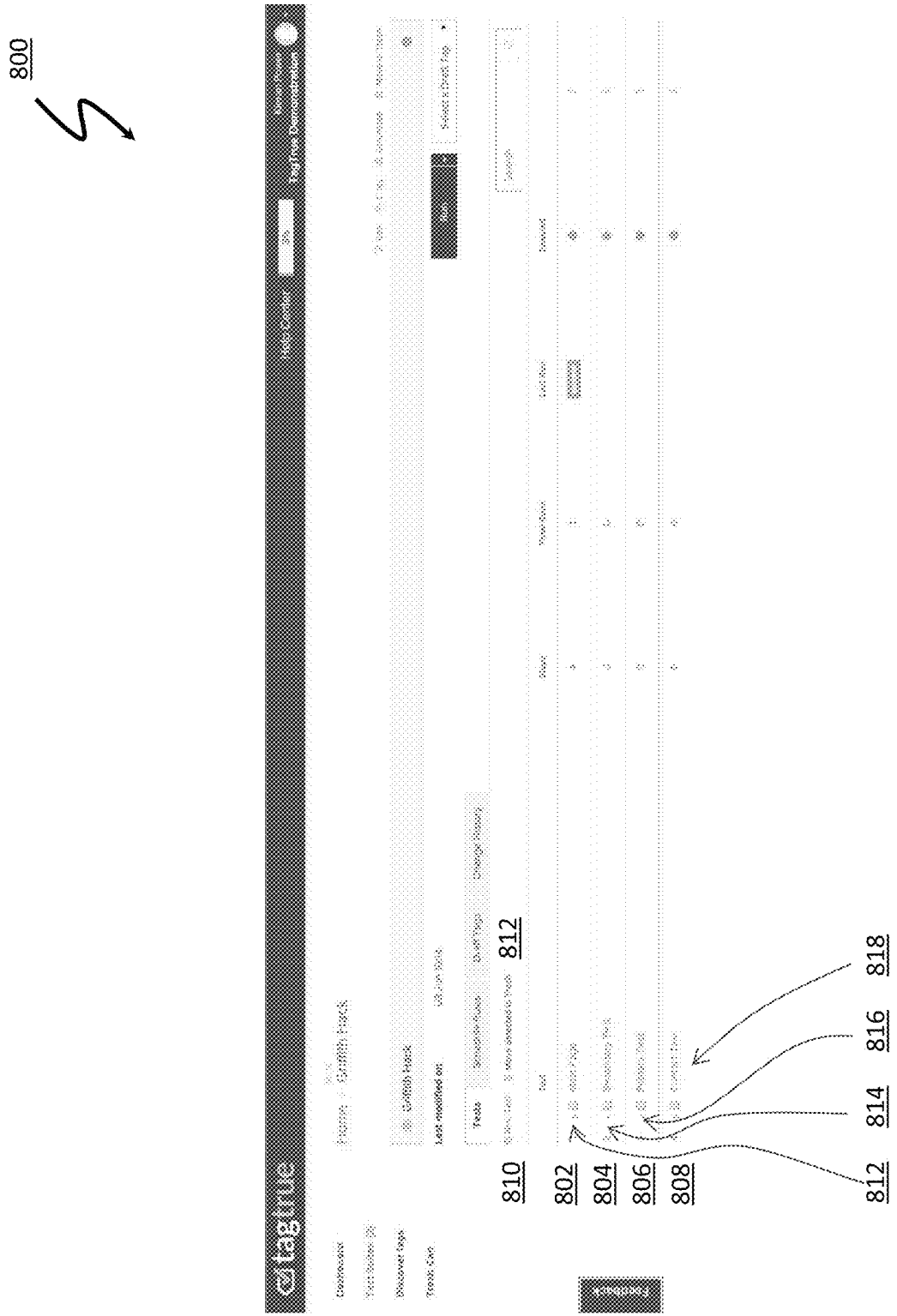
FIG. 8 shows a test list webpage used in the system of FIG. 1.

The test list webpage 800 identifies the various individual tests 802 to 808 that are part of the relevant test suite. While FIG. 8 shows four separate tests 802 to 808, the test list webpage 800 can contain any number of tests. The test list webpage 800 allows the user of the user computer 102 to create new tests or delete existing tests. To create a new test the user of the user computer 102 uses the computer's 102 mouse to click on the new test option 810. To remove an existing test 802 to 808 the user of the user computer 102 can use the computer's mouse to first check the relevant check box 812 to 818 of the tests 802 to 808. Once the relevant test check box 812 to 818 has been checked the user of the user computer 102 can use the mouse of the computer 102 to click the move selected to trash option 812.

Using the mouse of the user computer 102 the user can click any of the tests 802 to 808 to view specific details of the tests and execute the tests. When the user clicks on a particular test 802 to 808, the user computer 102 will generate certain data representing the test 802 to 808 that was clicked on and send that data to the application server 104 via the data links 110a and 110b and the data network 108. On receiving the data from the user computer 102 the application server 104 will generate a detailed test webpage 900 and send that webpage 900 (see FIG. 9) to the user computer 102 via the data links 110a and 110b and the data network 108. On receiving the detailed test webpage 900 the user computer 102 renders the webpage 900 on the screen of the user computer 102 so that a user of the computer 102 can view the detailed test webpage 900.

The Steps

Figure 9:
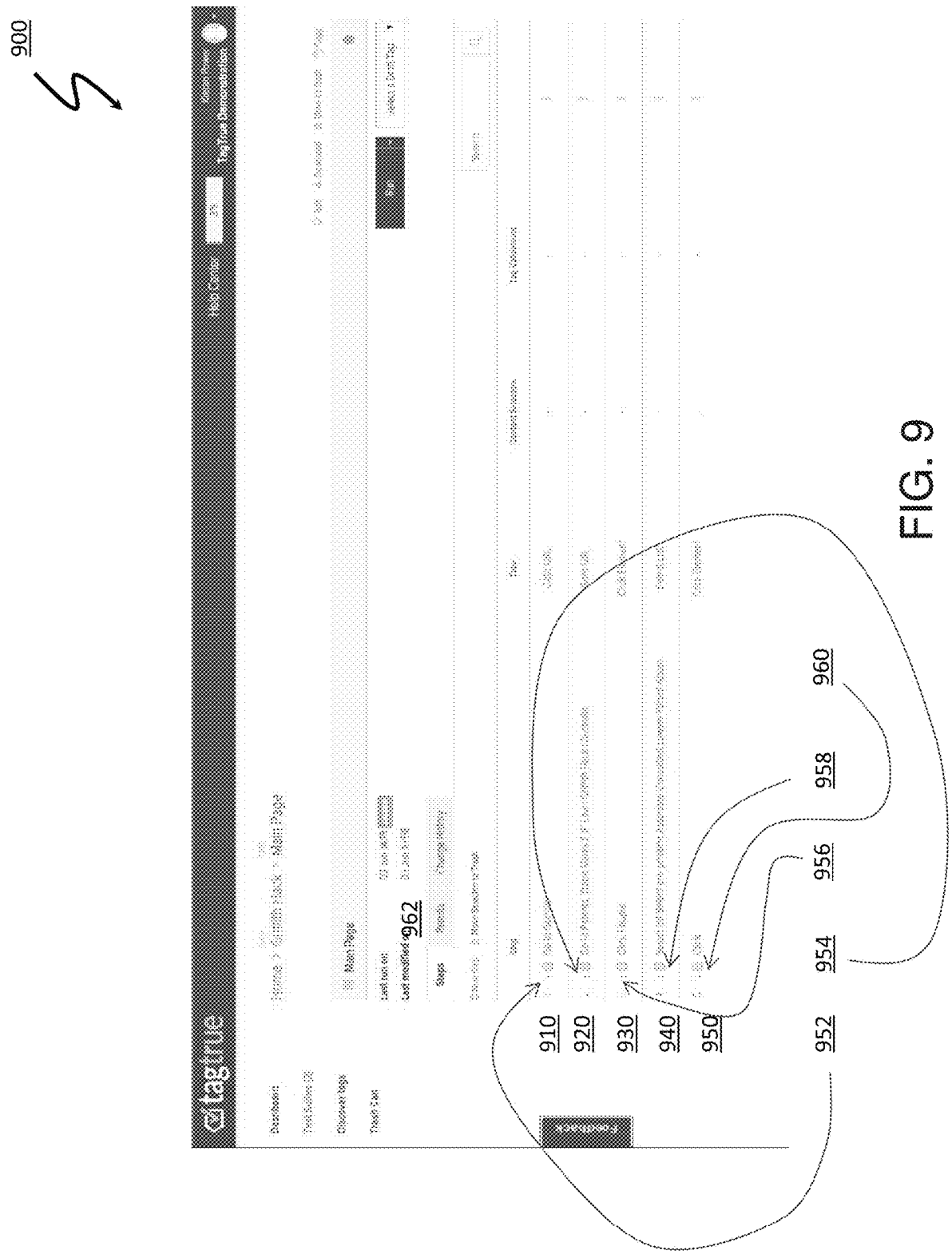
FIG. 9 shows a detailed test webpage used in the system of FIG. 1.
Figure 10:
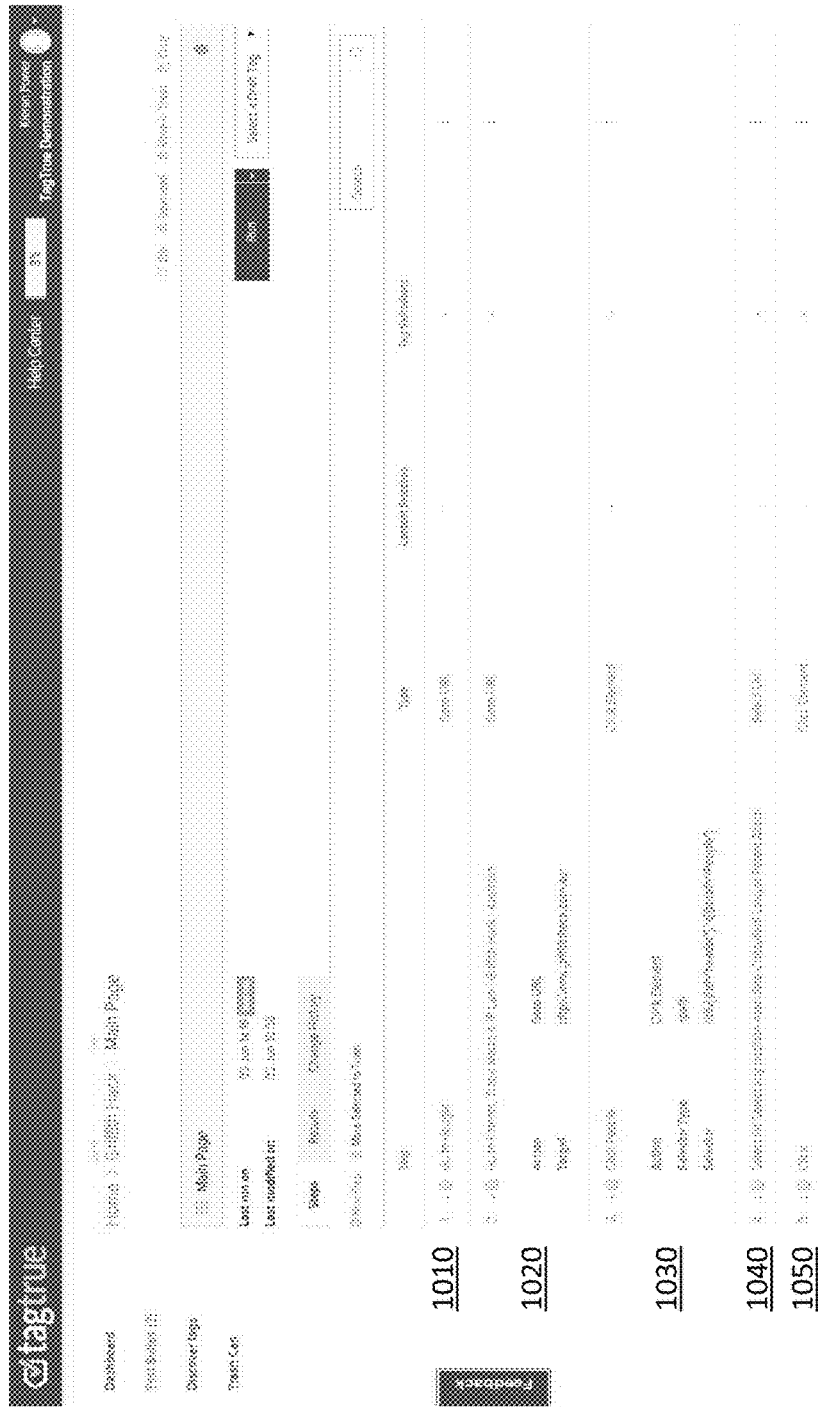
FIG. 10 shows the webpage of FIG. 9 but with additional details.

The detailed test webpage 900 identifies the various steps that are performed for the specific test. In the case of FIG. 9, this detailed test webpage 900 sets out the various steps 910 to 950 that make up the "Main Page" test 802 (see FIG. 8) of the "Griffith Hack" test suite 502 (see FIG. 5). In the case of the detailed test webpage 900 of FIG. 9, there are shown five specific steps 910 to 950; however, it is noted that there may be any number of steps in a test. Each of the steps 910 to 950 represent specific steps that are performed when the Main Page test 802 is executed. The specific details associated with each of the steps 910 to 950 can be viewed by clicking on the expand arrow 952 to 960 adjacent the test step 910 to 950 of interest. Referring to FIG. 10, two steps 1020 and 1030 have been expanded to reveal the exact details of the relevant steps 1020 and 1030. In the case of the second step 1020 it can be seen that this step involves going to the URL www.griffithhack.com.au while the third step 1030 involves clicking on the element "people". Essentially what this means is that when these test steps are run the application server 104 will go to www.griffithhack.com.au and when the application server 104 receives the webpage at the URL it will follow the "people" link. As will be described in more detail in subsequent paragraphs of this description, an error message will be generated by the application server 104 if it cannot access www.griffithhack.com.au or the received webpage does not contain a "people" link.

Test Builder

Figure 13:
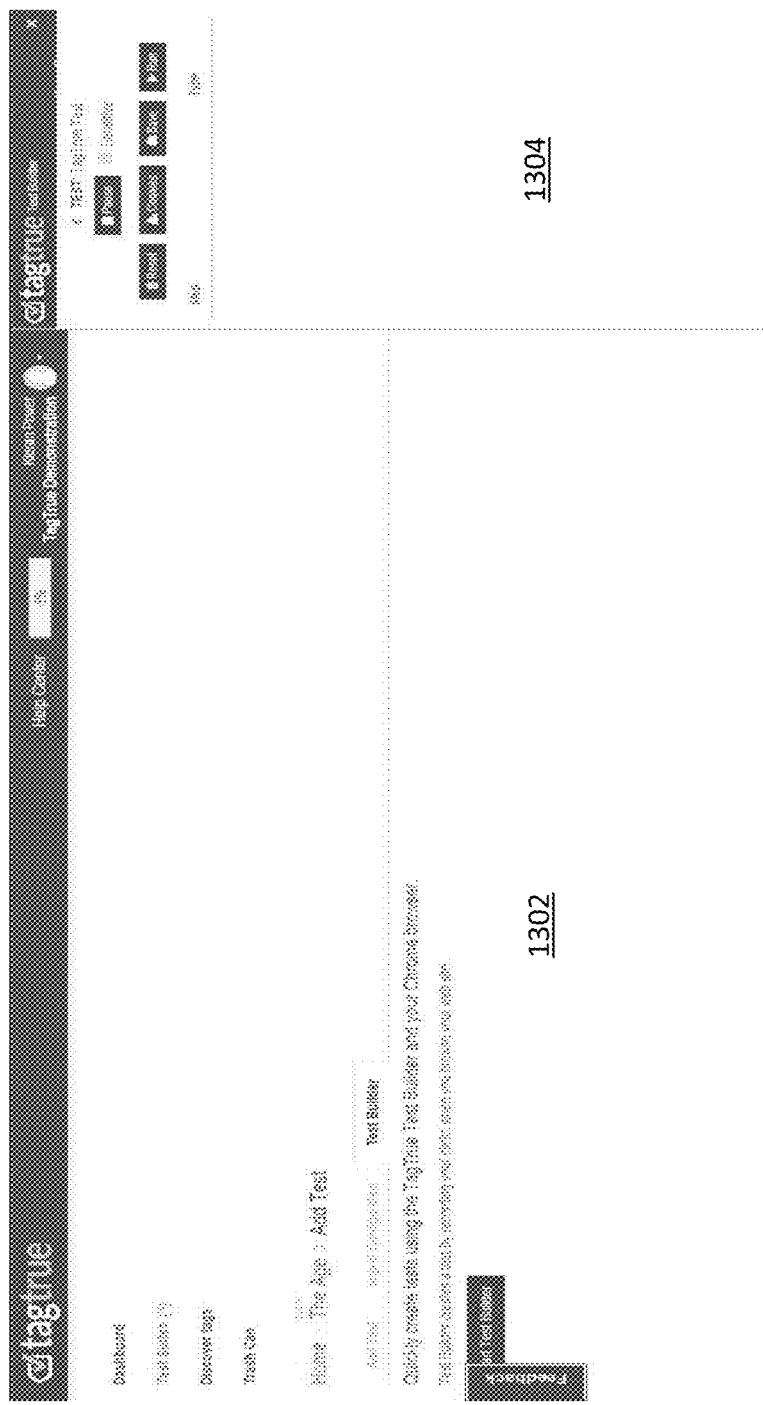
FIG. 13 shows another view of the test builder webpage used in the electronic system of FIG. 1.

To build a test using the test builder webpage 1200 (see FIG. 2) the user of the user computer 102 can use the computer's 102 keyboard to launch the test builder chrome extension by clicking on the test builder tab 1204 and then clicking on the start test builder button. In response to this the user computer 102 generates data indicating that the start test builder button has been clicked on and sends that data to the application server 104 via the data links 110a and 110b and the data network 108. In response to receiving this data, the application server 104 generates a further test builder webpage 1300 (see FIG. 13). Once the further test builder webpage 1300 has been generated, the application server 104 sends the webpage 1300 to the user computer 102 via the data links 110a and 110b and the data network 108. On receiving the further test builder webpage 1300 from the application server 104 the user computer 102 renders the webpage 1300 on the display of the computer 102 so that it can be viewed by the user.

Figure 14:
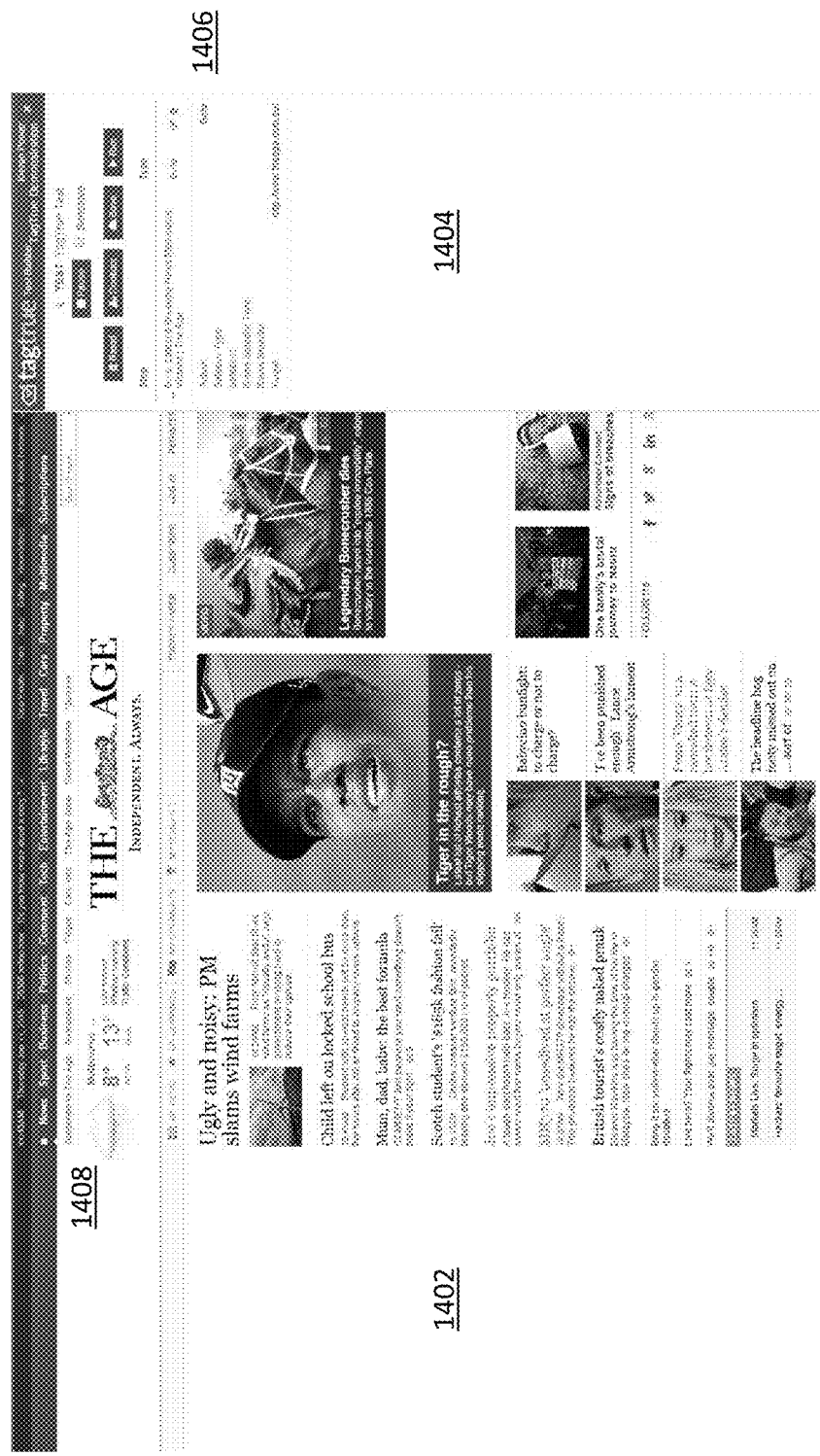
FIG. 14 shows another view of the test builder webpage used in the electronic system of FIG. 1.

The test builder webpage 1300 offers a series of functions that enable a user of the user computer 102 to easily and quickly build up a test that can be subsequently run at any time to ensure the relevant electronic documents (webpages) conform to the requirements set out in the test. The test builder webpage 1300 comprises two main sections: the first section 1302 is used to display the webpage for which the test is to be built; and the second section 1304 is the test build section. More specifically, to build a test the user of the computer 102 types into their web browser the web address for the webpage they wish to establish the test for. The user types in the webpage address only once the test builder webpage 1300 has been displayed. As can be seen in FIG. 14, the first section 1402 of the test builder webpage 1300 now shows the webpage located at www.theage.com.au (which was the web address typed into the user computer's 102 web browser). The second section 1404 of the test builder webpage 1400 now shows the first test step 1406, which was generated as a consequence of the user entering in www.theage.com.au in to their web browser. The first test step 1406 represents a goto web address command. At this point the user of the user computer 102 can interact with the webpage at www.theage.com.au to establish further steps for the test. For example, the user can click on the subscribe to the age link 1408 and as can be seen in FIG. 14. This results in a further test step 1506 being added to the second section 1504 of the test builder webpage 1500. The further test step 1506 is basically the command to retrieve the subscription webpage in FIG. 15. The user of the user computer 102 can continue to build up a sequence of test steps by interacting with the webpage displayed in the first section 1502 of the test builder webpage 1500. For example, by clicking on the All digital+7 day subscription select button 1508 that step 1606 (see FIG. 16) is recorded in the second section 1604 of the test builder webpage 1600.

Figure 17:
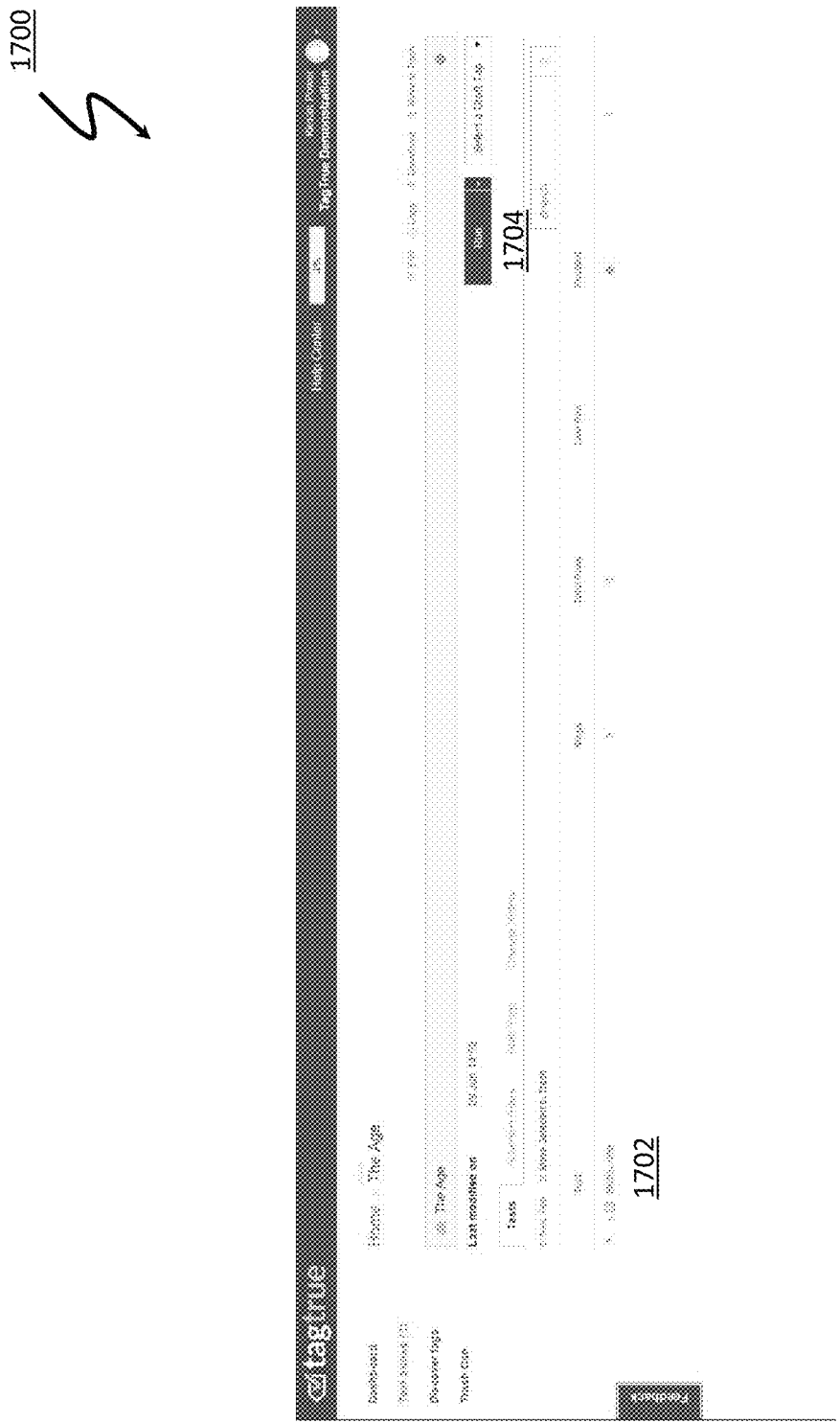
FIG. 17 shows a test list webpage used in the electronic system of FIG. 1.
Figure 18:
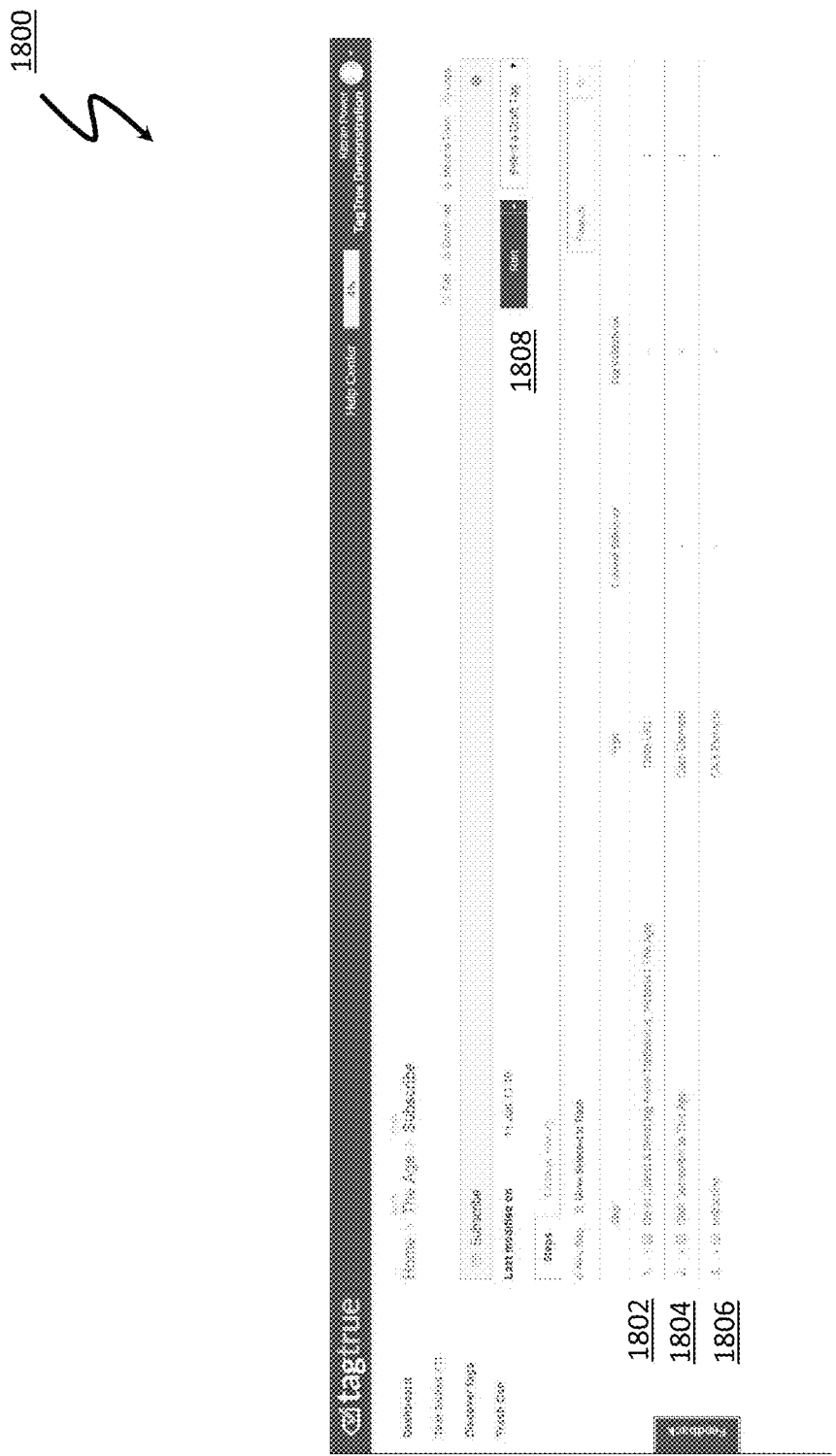
FIG. 18 shows a test steps webpage used in the electronic system of FIG. 1.

Once the user of the user computer 102 has completed building up the steps for their test, the user can use the mouse of the user computer 102 to click on the save button 1608 of the second section 1604 of the test builder webpage 1600. In response the application server 104 will save the test so it can be executed at a later time. Referring now to FIG. 17 which shows the test list webpage 1700 for the Age the previously defined test 1702 related to the subscription selection now appears. By clicking in the subscribe link 1702 the user is taken to the test steps webpage 1800, which shows the previously defined three steps 1802 to 1806 associated with the pathway to subscribe to the Age.

Figure 19:
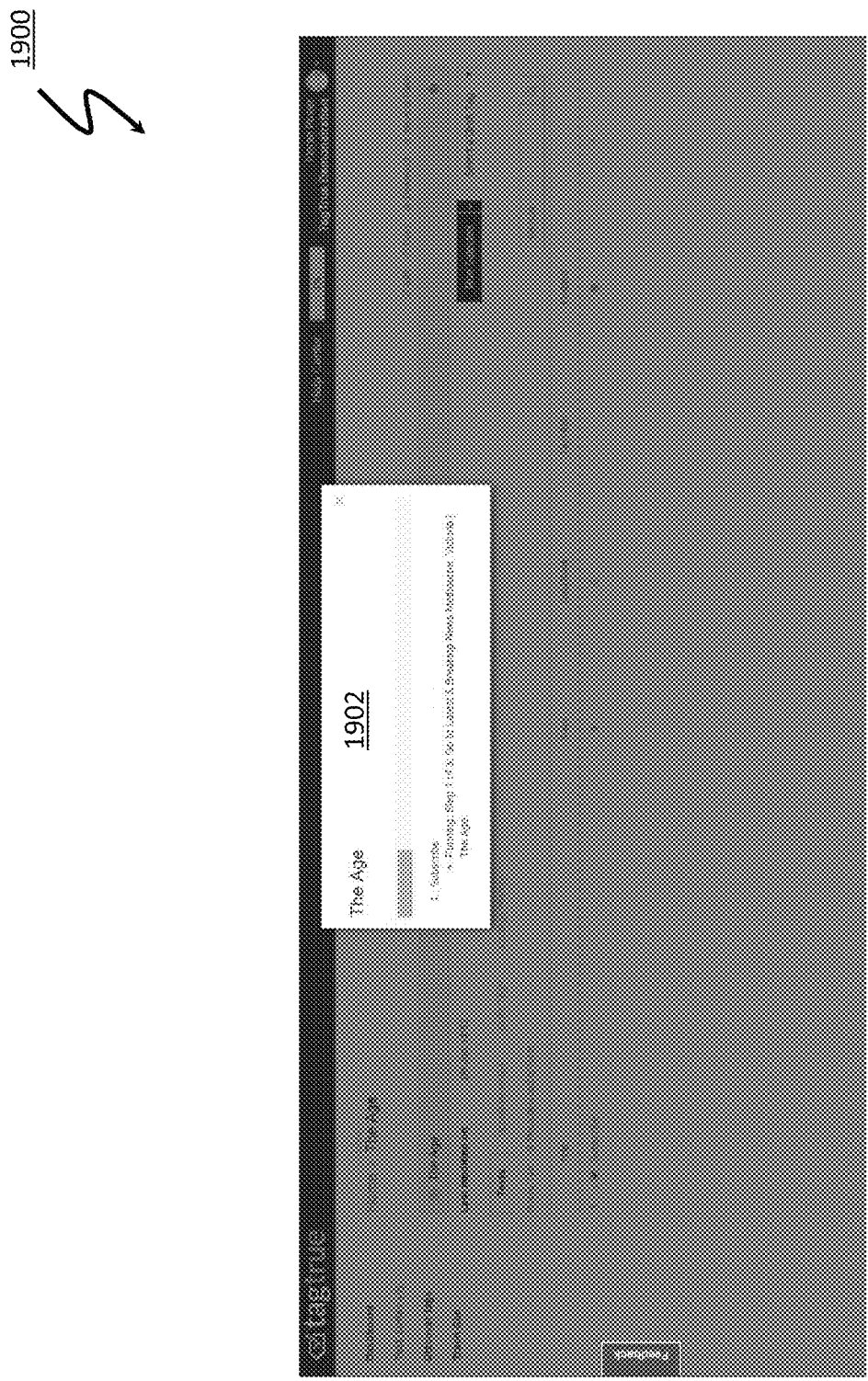
FIG. 19 shows a test run status webpage used in the electronic system of FIG. 1.

At any subsequent point in time a user of the user computer 102 can run the subscribe test 1702 for the Age website at www.theage.com.au by clicking on the run button 1704 (see FIG. 17). In response to the run button 1704 being clicked on the application server 104 will carry out the three steps 1802 to 1806 associated with the subscribe test 1702. While the test is running the application server 104 will generate a status webpage 1900 (see FIG. 19), which is sent to the user computer 102 via the data links 110a and 110b and the data network 108. The user computer 102 will render the status webpage 1900 on the display of the user computer 102 so that the user of the computer 102 knows how the test is progressing. The progress is illustrated to the user of the user computer 102 by way of the green progress bar 1902.

Figure 20:
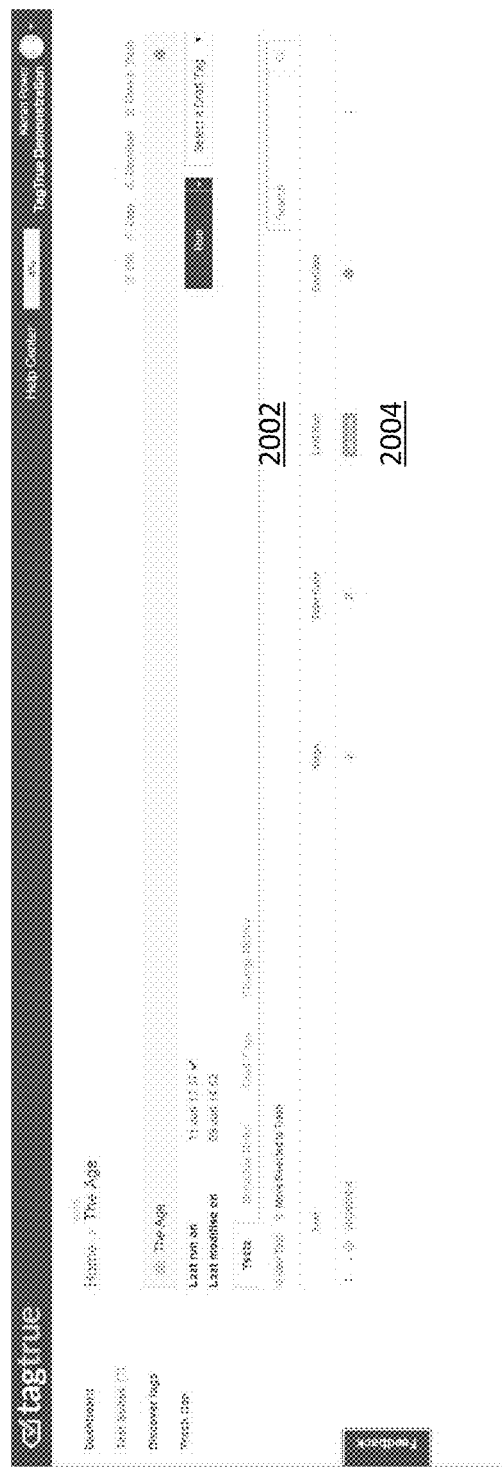
FIG. 20 shows another view of the test list webpage showing a successful test run used in the electronic system of FIG. 1.

Once a test has been run and completed, the application server 104 will update the test list page 1700 to indicate whether the test run was completed successfully or whether errors were encountered. Referring to FIG. 20, if the test run was completed successfully then the last run field 2002 of the test list page 2000 will contain a green success indicator 2004. However, if the test run has been unable to complete successfully, with reference to FIG. 21, the last run field 2102 of the test list page 2100 will contain an orange error indicator 2104. Alternatively, however, if the test run was completed successfully and errors were identified within the website tested with reference to FIG. 21A the last run field 2110 of the test list page 2106 will contain a red failed indicator 2108.

Figure 15:
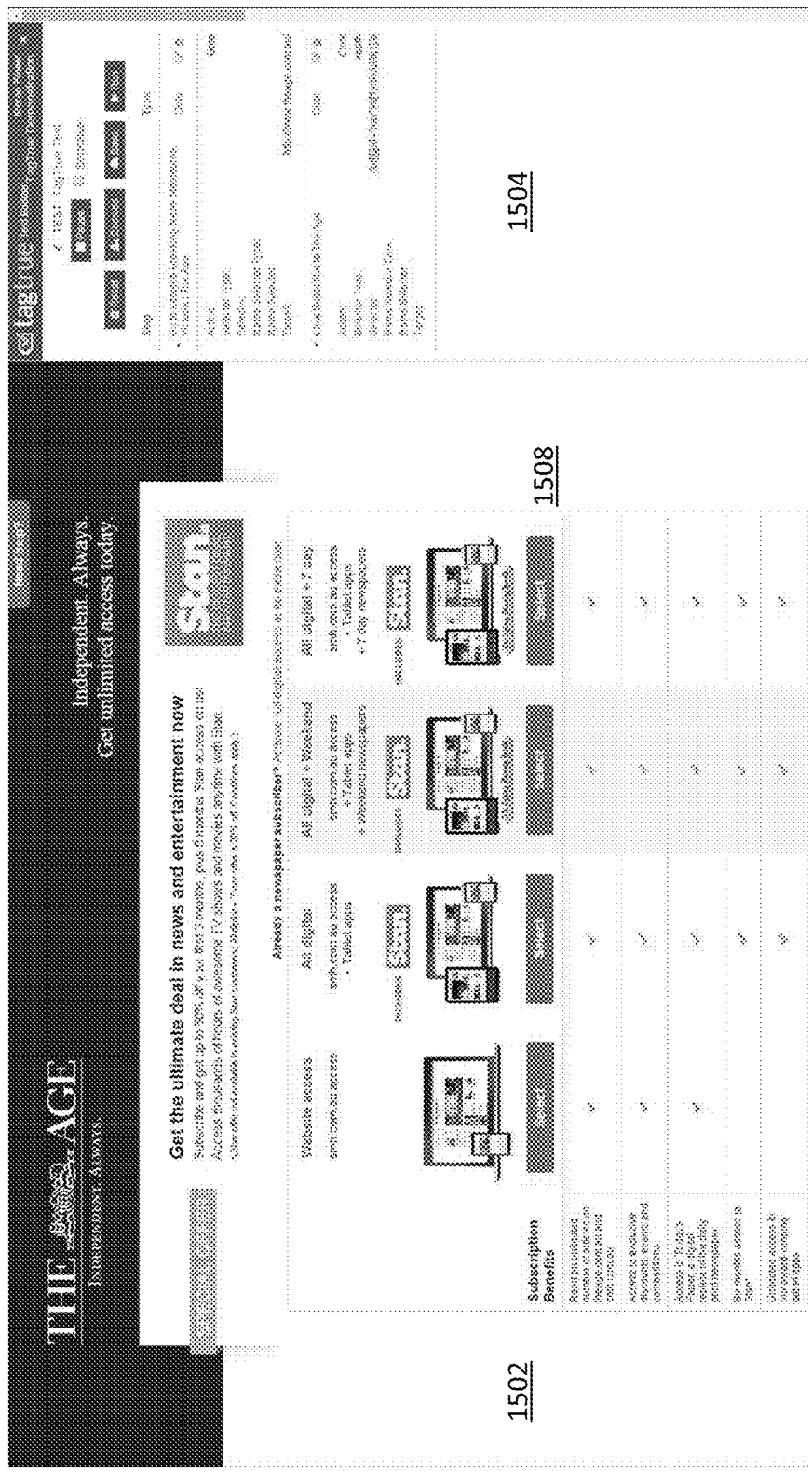
FIG. 15 shows another view of the test builder webpage used in the electronic system of FIG. 1.
Figure 16:
FIG. 16 shows another view of the test builder webpage used in the electronic system of FIG. 1.
Figure 21:
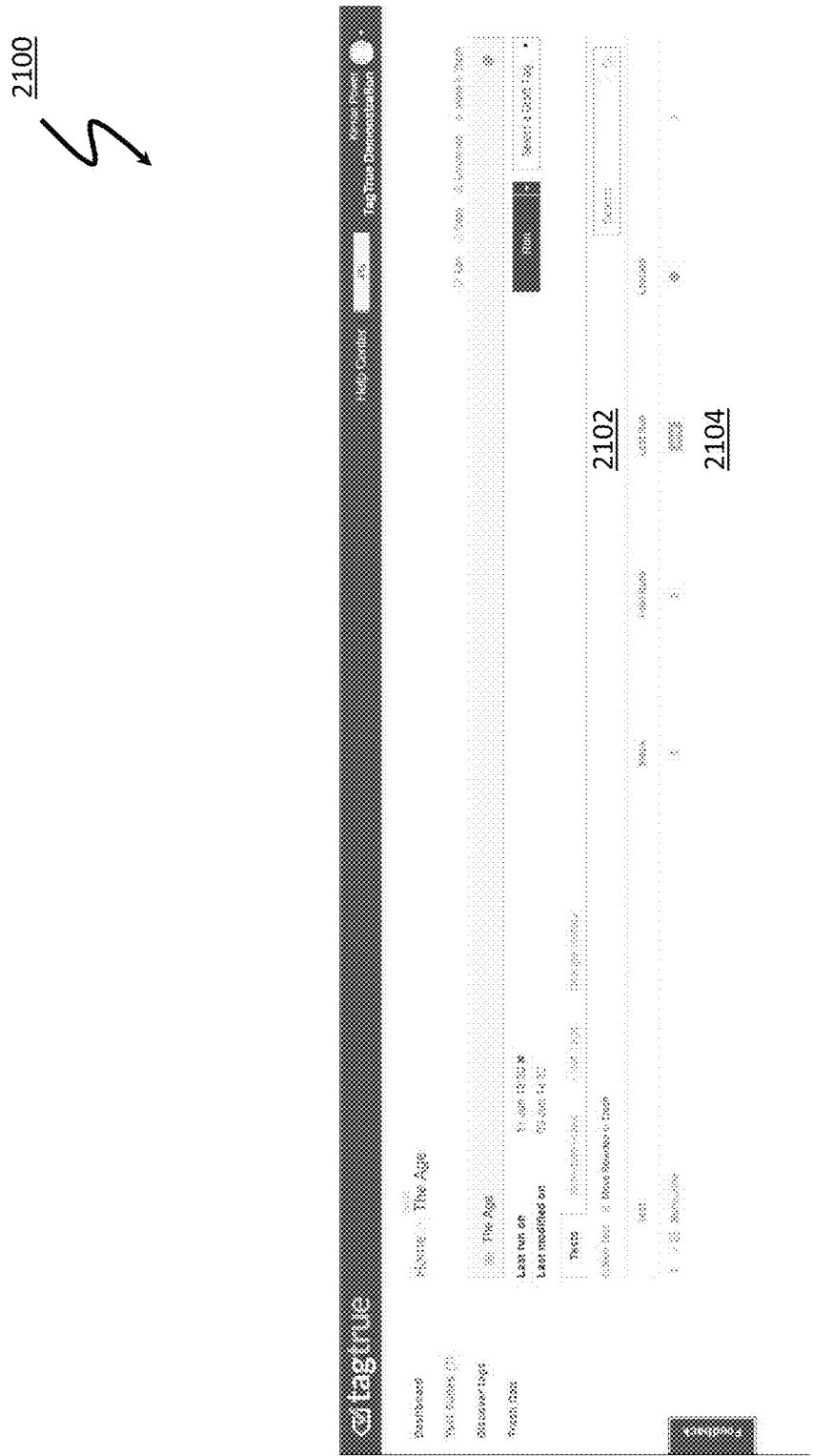
FIG. 21 shows another view of the test list webpage showing a test run error used in the electronic system of FIG. 1.
Figure 21A:
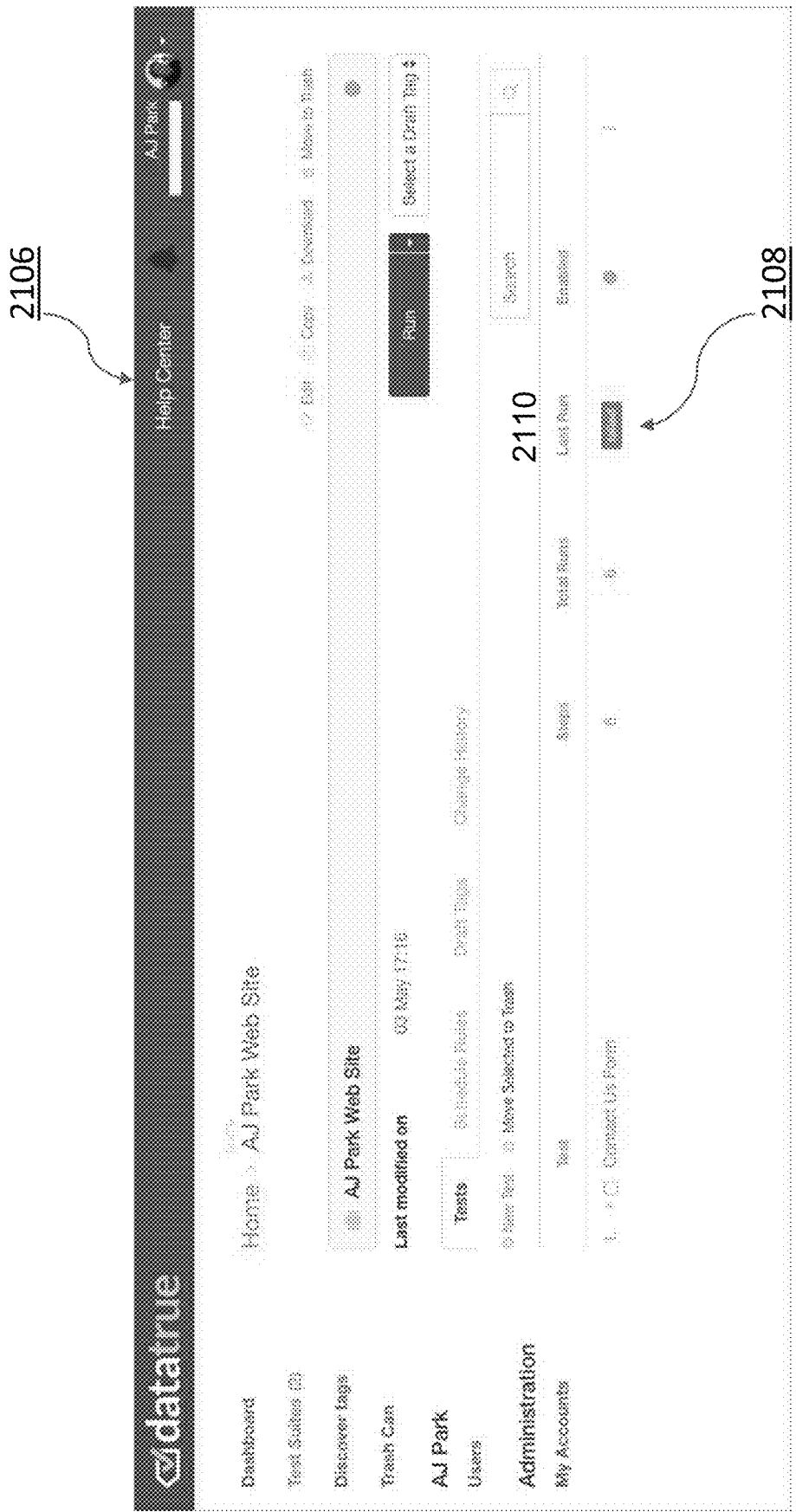
FIG. 21A shows another view of the test list webpage showing a failed test run used in the electronic system of FIG. 1.
Figure 22:
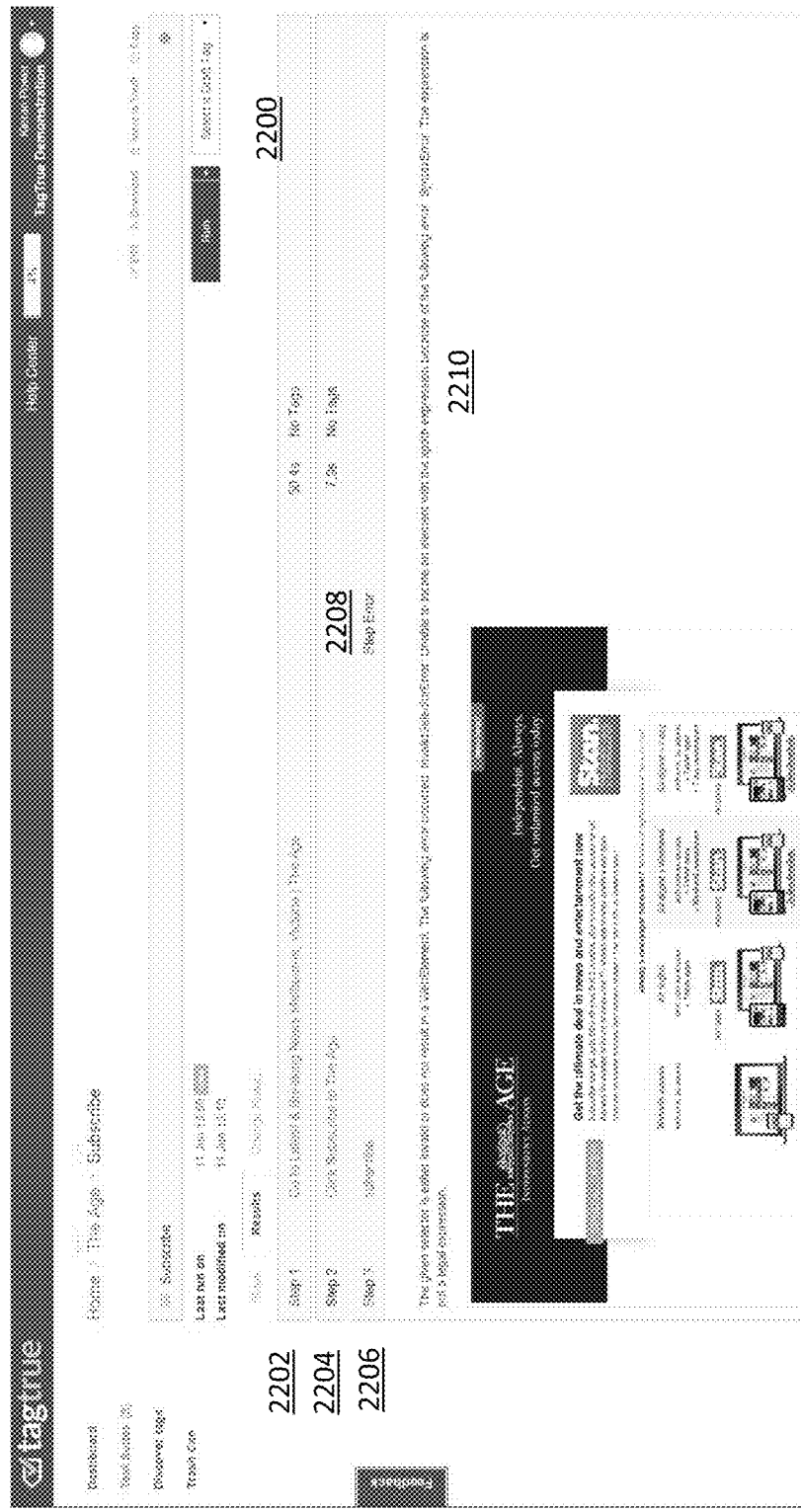
FIG. 22 shows a test result webpage used in the electronic system of FIG. 1.
Figure 23:
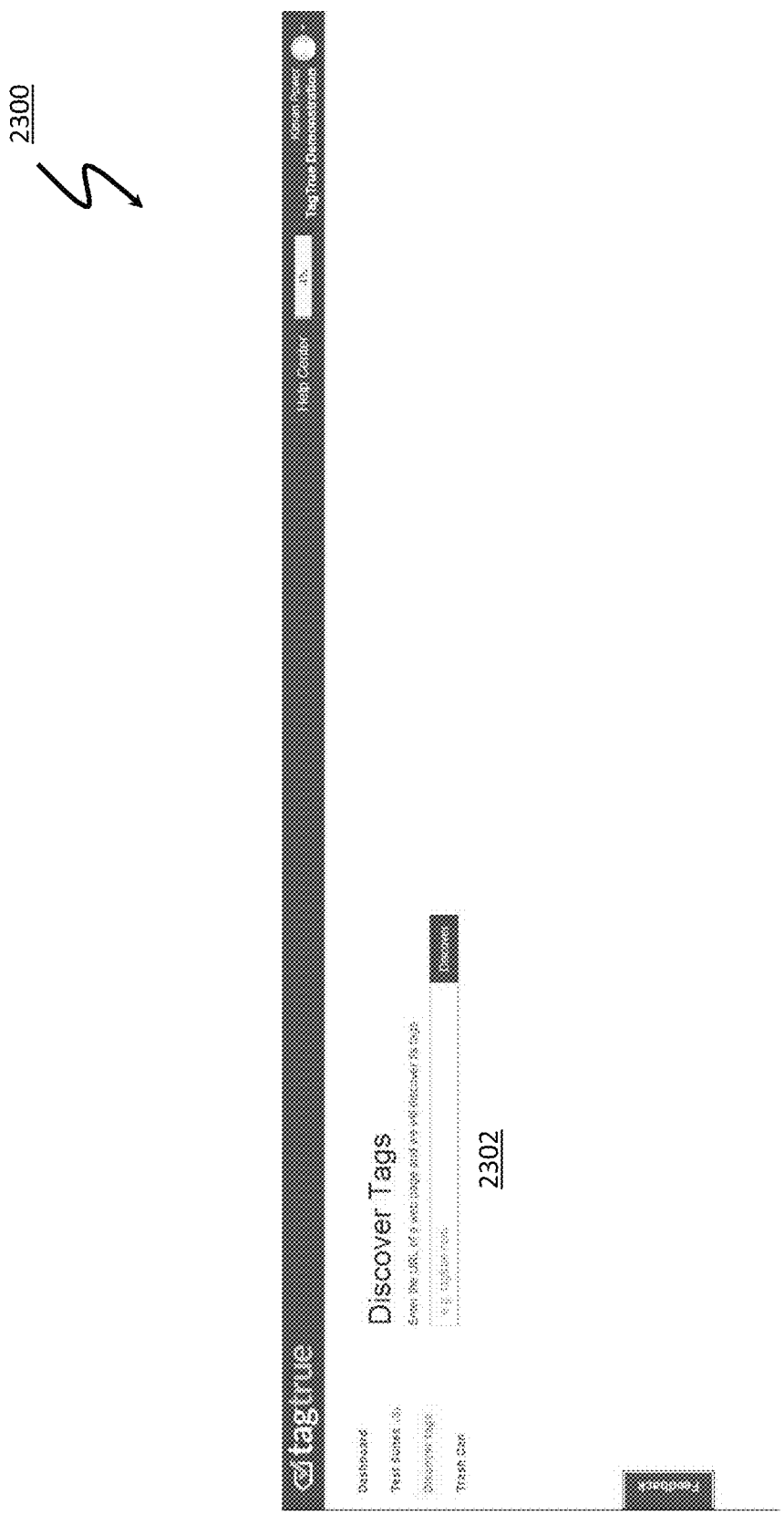
FIG. 23 shows a tag discovery webpage used in the electronic system of FIG. 1.

By way of example, the subscribe test previously described in relation to the Age website would fail for example if the subscription page shown in FIG. 15 was not available. If as shown in FIG. 21 the test returned an error, the user of the user computer 102 can click on the results tab 962 of the test steps webpage 900 (see FIG. 9). In response to the results tab 962 being clicked on the application server 104 will generate a test results webpage 2200 (see FIG. 22) and send that webpage 2200 to the user computer 102 via the data links 110a and 110b and the data network 108. On receiving the results webpage 2200 the user computer 102 renders the webpage 2200 on the display of the computer 102 so the user can view the webpage 2200. The results webpage 2200 include the results of the previously described subscribe test for the Age website.

The three previously described test steps 2202 to 2206 that form part of the subscription test are shown in the results webpage 2200. It can be seen from the results webpage 2200 that the reason the test failed and generated an error is because there was a problem in executing step 3 2206. The step that caused the error is highlighted by the error message 2208. Because there is no such error message 2208 against steps 1 and 2 it can be assumed that steps 1 and 2 were performed without any errors. By examining the error report 2210 the user of the user computer 102 is provided with more detail concerning why the error was generated. This allows the relevant IT administrator at www.theage.com.au to efficiently and easily rectify the flow through the website to ensure the subscription page can be accessed and avoid future test errors.

Tag Validation

The previous description in relation to creating and executing tests is very much focused on establishing tests to test the integrity of user flows through a website, such as a user being able to access the subscription page at www.theage.com.au. The benefit of these tests is that they can quickly and easily report errors about broken links in a webpage that prevent a certain destination (e.g., subscription page) from being accessed by the desired route through the webpage. However, the tests that can be created and executed by the application server 104 are not restricted to testing webpages for broken links. A very important part of contemporary websites is that they can be configured to collect and send data to third party analytics engines such as that offered by Google, Adobe or Webtrends. The ability for a webpage to collect and send data to analytics engines is important since it allows website operators to understand a range of information concerning access to their websites. For example, the analytics capability allows online retailers to understand detailed information about visitors that visit their website. As such, it is very important that websites designed to collect analytics data do so correctly. If a website is not collecting the appropriate analytics data then the analytics information made available to the website operator will be misleading and provide little commercial insight.

Tests can be established to determine whether electronic documents (such as websites) conform to certain requirements. The various steps that make up a test can assess websites to ensure they are providing the necessary data to the analytics engine. To support this, the main account webpage 400 (see FIG. 4) provides some functionality for supporting webpage tags. Webpage tags are essentially small pieces of code (commonly written in JavaScript) that collect certain data and pass that data on to the analytics engine for subsequent reviewing by the website operator. When the user of the user computer 102 clicks on the discover tag 404 the application server 104 generates a discover tag webpage 2300 and sends that webpage 2300 to the user computer 102 via the data links 110*a* and 110*b* and the data network 108. On receiving the discover tag webpage 2300 the user computer 102 renders the webpage 2300 on the screen of the user computer 102 so it can be viewed by the user. The user webpage 2300 contains a dialogue box 2302, which the user of the user computer 102 can type in a web address. In response to the web address being entered into the dialogue box 2302, the application server 104 will examine the relevant webpage and generate a tag report webpage 2400 (see FIG. 24) and sends that webpage 2400 to the user computer 102 via the data links 110*a* and 110*b* via the data network 108. On receipt of the tag report webpage 2400, the user computer renders the webpage 2400 on the display of the user computer 102. By way of example, FIG. 24 show a tag report webpage 2400 for the webpage located at www.theage.com.au. The tag report 2400 indicates that www.theage.com.au has nine separate tags each of which will be collecting different pieces of data and sending that data to the relevant third party analytics engines.

The user of the user computer 102 can create a test in relation to any of the tags identified in the tag report webpage 2400 by initially clicking on the create new test button 2402. In response the application server 104 will generate a tag test and provide details of that tag test in a tag test webpage 2500 which is sent to the user computer 102 via the data links 110*a* and 110*b* and the data network 108. The user computer 102 renders the tag test webpage 2500 on the display of the user computer 102 so that it can be viewed by the user. It can be seen from the tag test webpage 2500 that it contains a tag validation field 2502, which indicates how many tags this test will validate when the test is run. The tag test webpage 2500 was generated in relation to www.theage.com.au and as can be seen in FIG. 24 this site contains nine main tags. Accordingly, the test shown in the tag test webpage 2500 shows that nine tags will be validated.

Figure 25:
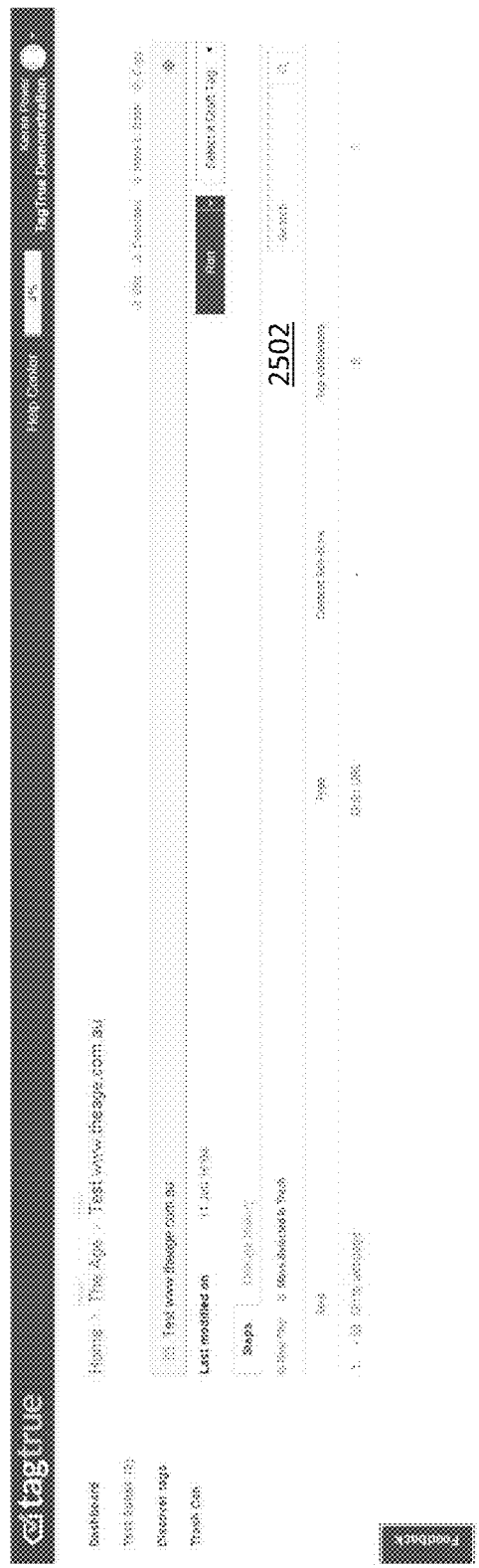
FIG. 25 shows a tag test webpage used in the electronic system of FIG. 1.

The tag test shown in FIG. 25 can be saved and run at any time. So, if any changes are subsequently made to the site www.theage.com.au the tag test can be run and if any of the changes alter the manner in which the tags operate that change will be shown as an test fail message as described previously.

Test Configuration and Management

Figure 26:
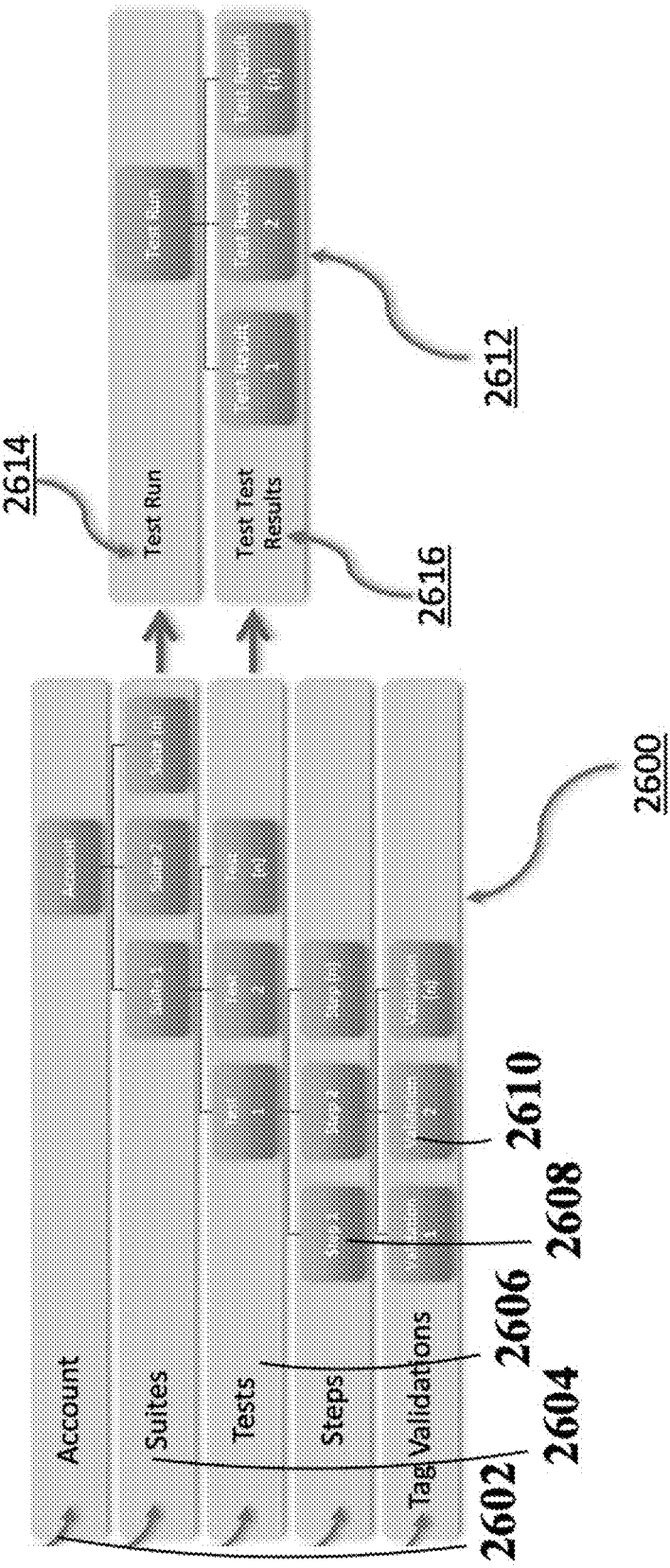
FIG. 26 shows a data model of the test configuration and management system used in the electronic system of FIG. 1.

Referring to FIG. 26, there is provided a breakdown of the test configuration and management 2600 of the test configuration by the user computer 102. An account 2602 established by the user of the user computer 102 (as shown in FIG. 6), provides a means for the user of the user computer to manage at least one test suite 2604.

At least one test suite 2604 provides a means for the user of the user computer 102 to manage individual tests 2606 within the test suite 2604. The user interface that displays the tests 2606 for the respective suite 2604 is illustrated by FIG. 8.

At least one test 2606 contains at least one step 2608 which is performed by at least one tag test in order to validate at least one tag 2610.

The results of the tag validations 2610 for each step 2608 in each test 2606 is set out in the corresponding test results 2612. For example, the results from Test 1 2606 are provided in Test Result 1 2616. At least one test result 2616 is set out in the Test run 2614.

Test Creation

Figure 12:
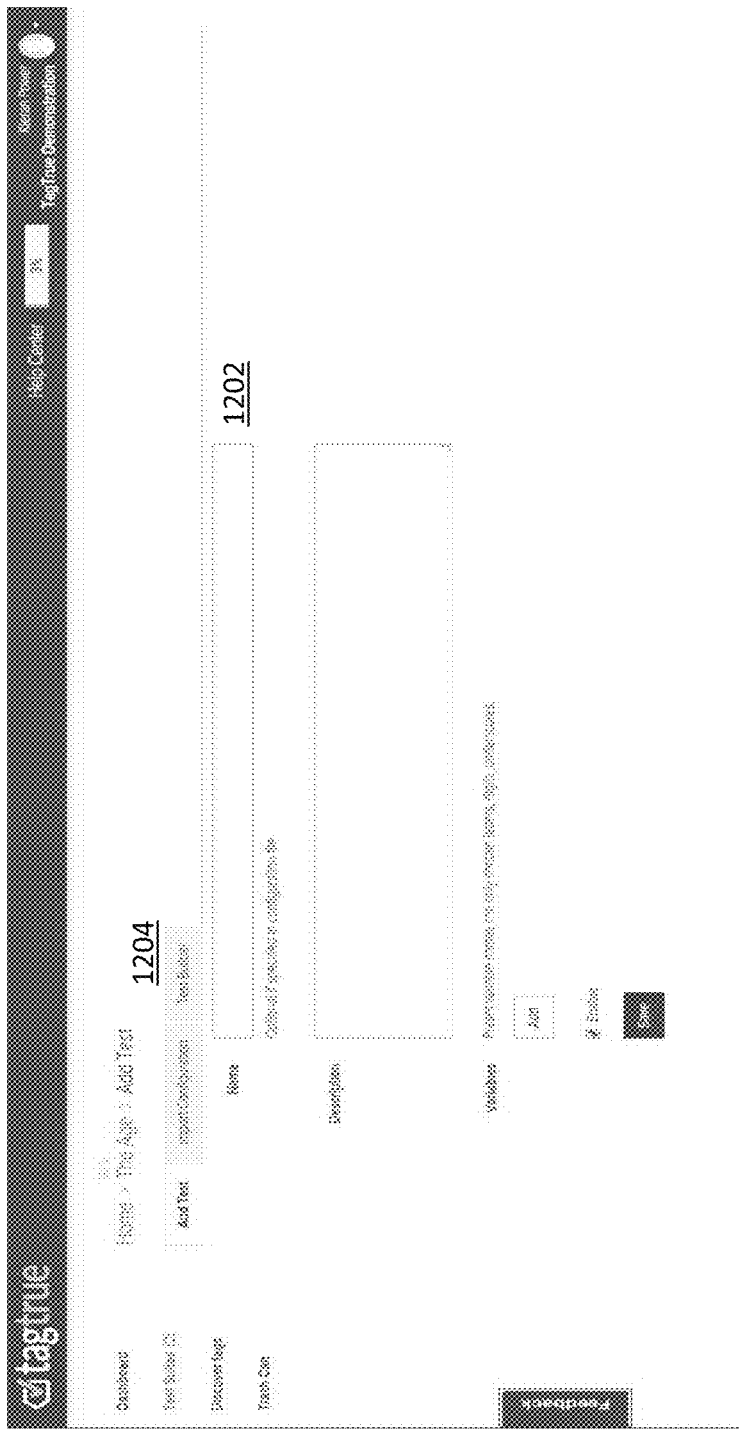
FIG. 12 shows a test builder webpage used in the electronic system of FIG. 1.
Figure 27:
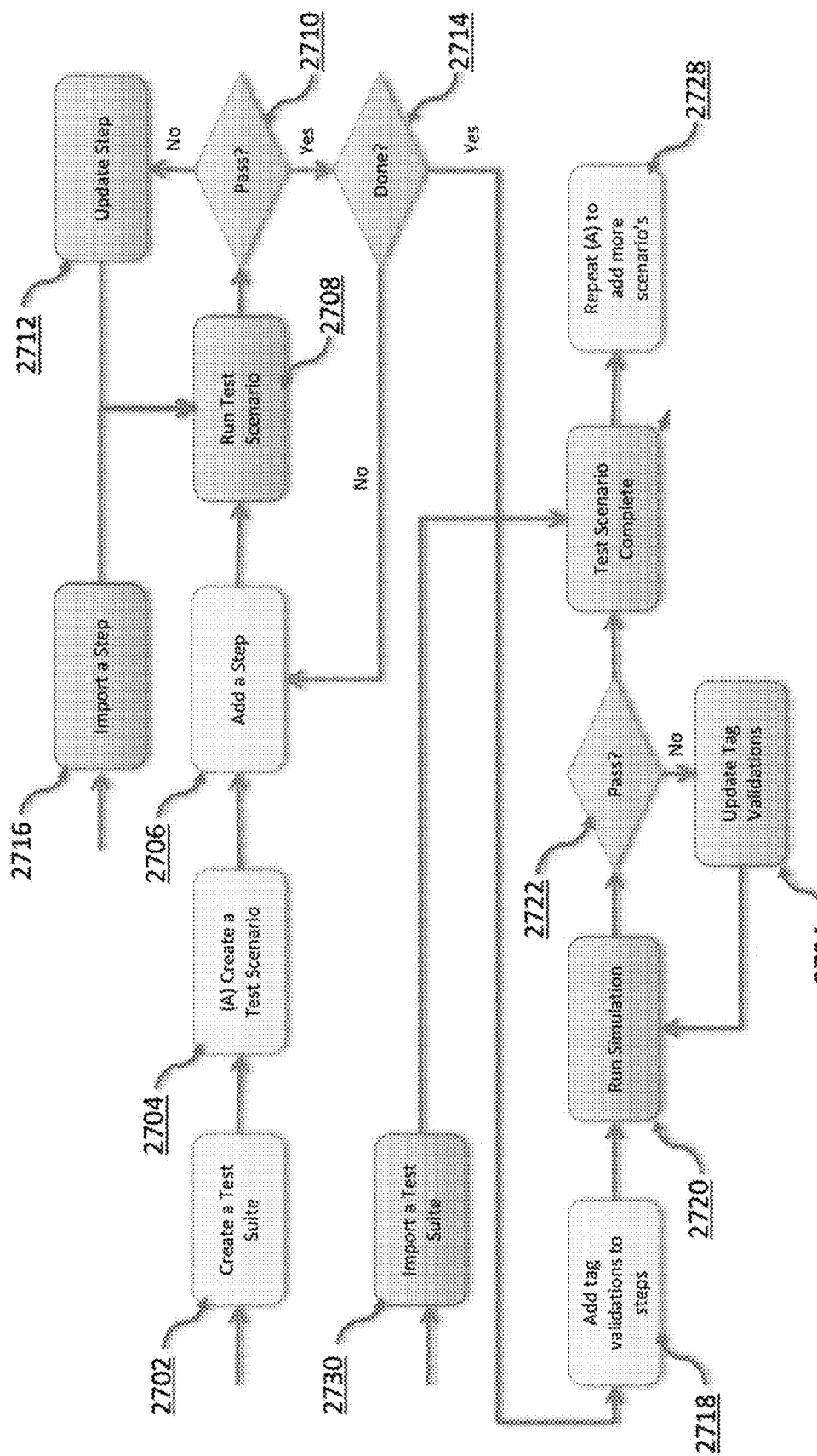
FIG. 27 shows the processes involved in test creation used in the electronic system of FIG. 1.

Referring to FIG. 27, there is set out the steps involved in the creation of a test 2606. Firstly, at 2702 the user of the user computer 102 creates a test suite, wherein the user of the user computer 102 can create a test (scenario) 2704. Once the test (scenario) 2704 has been established, the user of the user computer 102 can add a step 2706 to the test (scenario) the test builder feature that records each of the interactions performed by the user of the user computer 102 with an electronic document, such as a website. Each action the user of the user computer 102 takes is recorded as a separate step 2706 in a test (scenario) 2704. This action recorder process is described in greater detail in the above-mentioned test builder section with reference to FIGS. 12 and 13.

Once the user has finished adding steps 2706 to the test (scenario) 2704, the user of the user computer can run the test (scenario) 2708. The test (scenario) 2708 can be run by the user of the user computer 102 by clicking on the run button 1704 shown in FIG. 17. If the steps set out in the test (scenario) 2704 passes at 2710, the user can add an additional step 2706 and run the test (scenario) again at 2708. Alternatively if the test (scenario) does not pass at 2710, the user of the user computer 102 can update the step 2712 and re-run the test (scenario) at 2708. The user of the user computer 102 can also choose to import a step at 2716 to be included in the test (scenario) 2704.

Figure 27A:
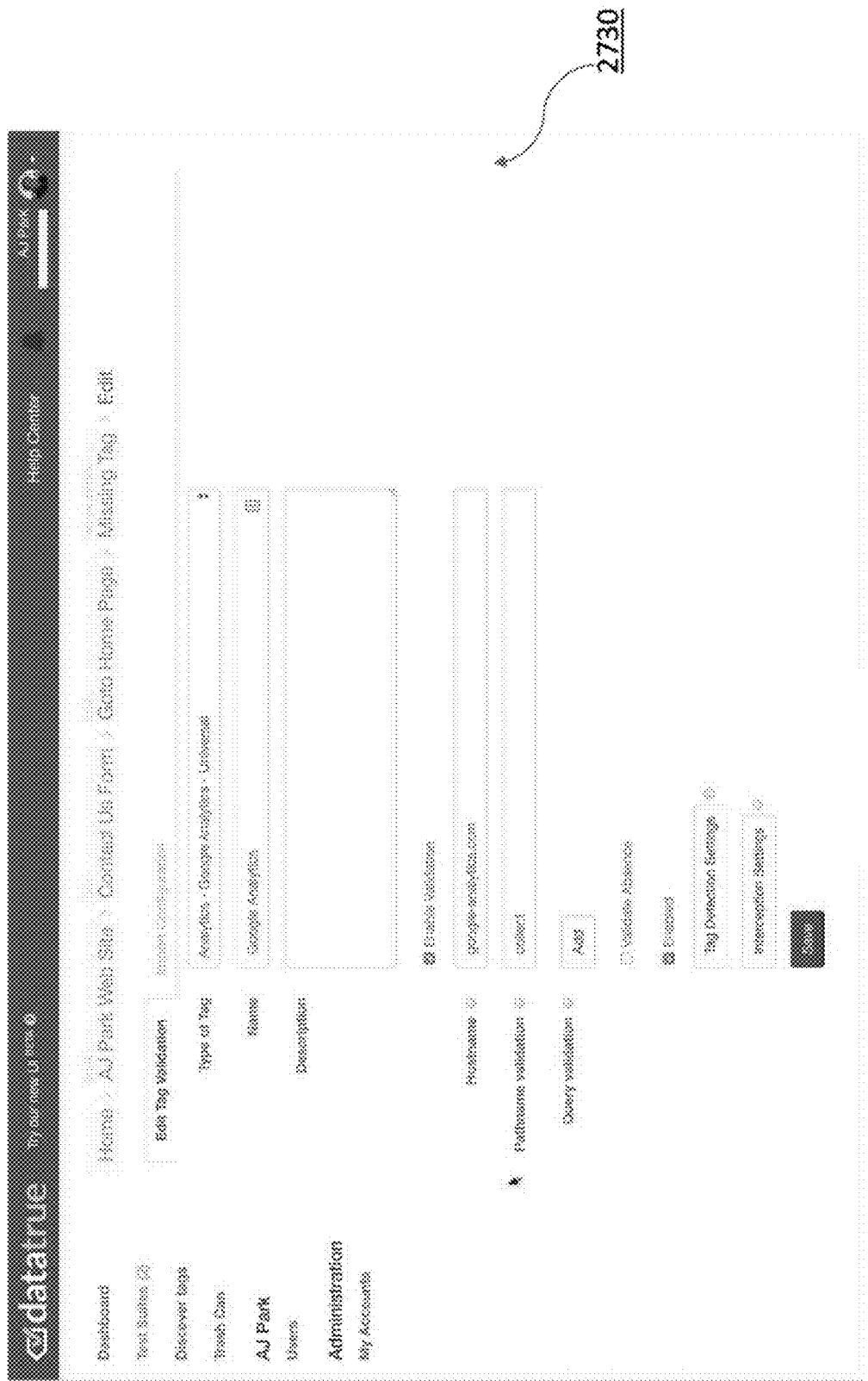
FIG. 27A shows a tag validation webpage used in the electronic system of FIG. 1.

Once the user of the user computer 102 has added sufficient steps in the test (scenario) 2704 and successfully performed the required interaction with the electronic document as required at 2714, then the user of the user computer 102 can add at least one tag validation criteria 2718 to the steps 2706. The user of the user computer 102 can then run the simulation 2720 which tests to see that the tags are functioning as intended. For example, the user of the user computer 102, can add a tag validation criteria 2718 which can determine if the tag is collecting and sending the correct metadata gathered from a website. FIG. 27A shows the user of the user computer 102 creating a tag validation test as shown by the webpage 2730. A range of criteria is entered by the user of the user computer 102 into the fields set out within the webpage 2730. The details of the tag validation is provided in greater detail with reference to FIG. 29. If the simulation 2720 indicates that the tags are functioning as intended as required at 2722 then the test (scenario) is complete as shown by 2726. If the simulation 2720 indicates that the tags do not pass the simulation at 2722, then the user of the user computer 102 can update the tag validation criteria 2724, before running the simulation again at 2720.

Figure 27B:
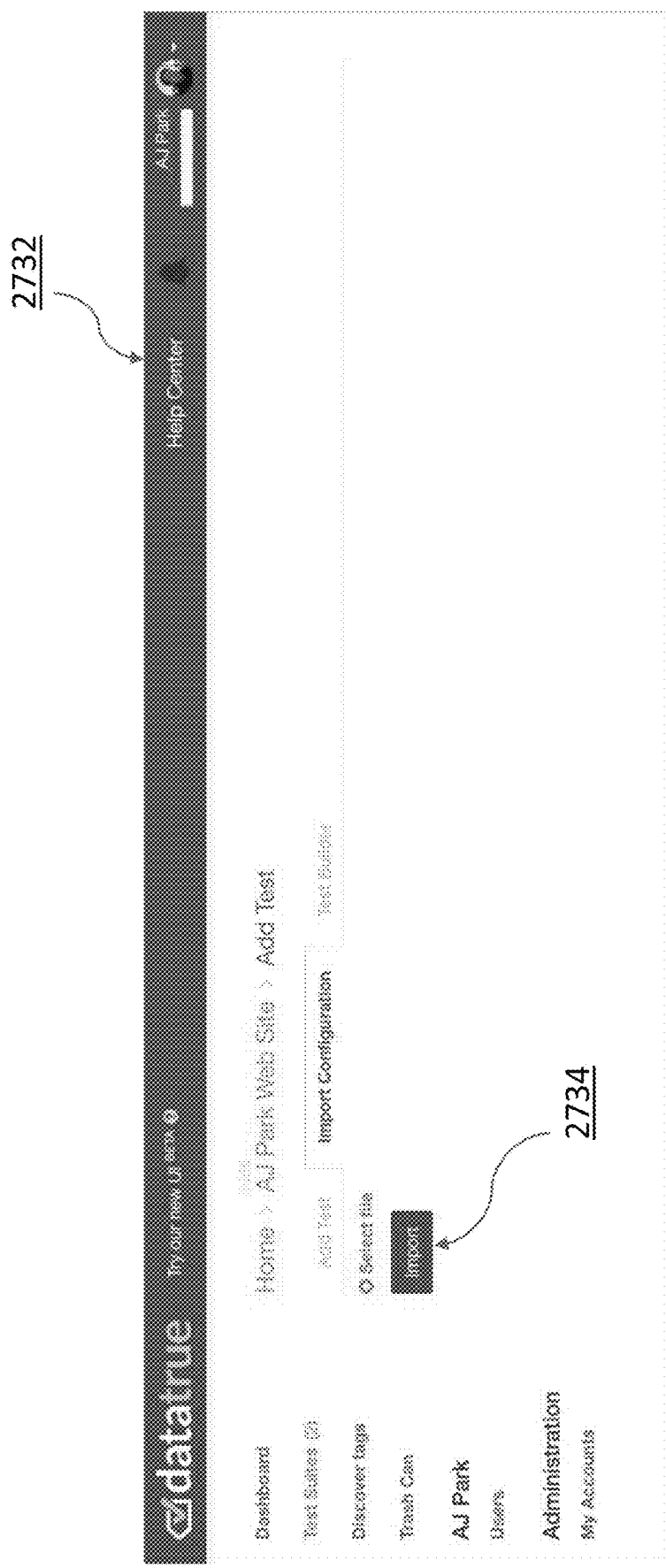
FIG. 27B shows a test import webpage used in the electronic system of FIG. 1.

Once the test (scenario) is complete 2726, the user of the user computer 102 can add additional test (scenarios) at 2728 by repeating the actions outlined above, which is illustrated in FIG. 27 as items 2704 to 2726. There is also provided a means to import at test by the user of the user computer interacting with the 'import tab' at 1204 as shown in the website FIG. 12. Alternatively, at FIG. 27B the user of the user computer 102 can import a test suite 2730, by clicking on the import button 2734 instead of the user of the user computer 102 undertaking the actions outlined above in FIG. 27 as items 2702 to 2726.

Test Execution

Figure 28:
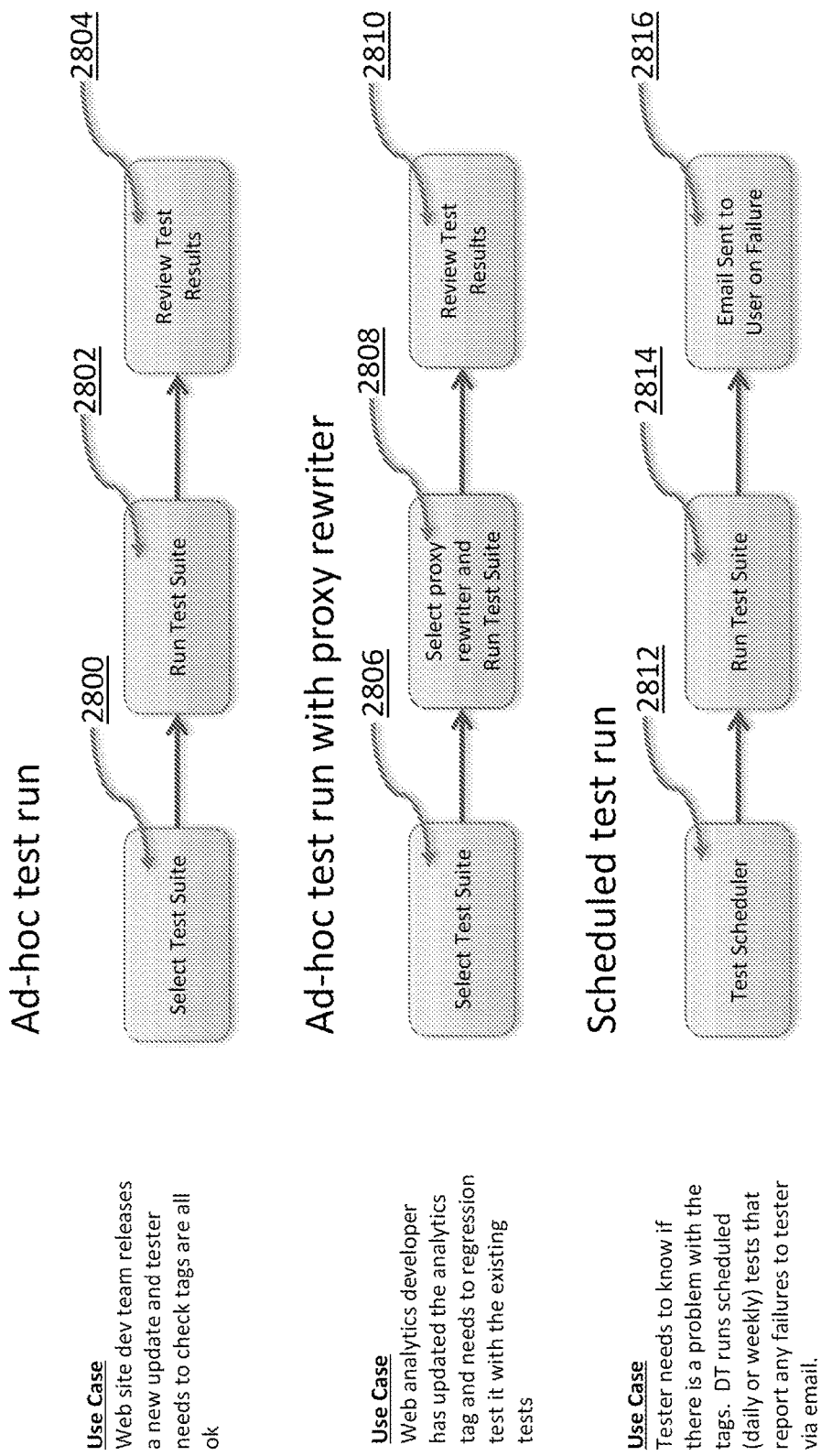
FIG. 28 shows the different manner in which tests can be run as used in the electronic system of FIG. 1.
Figure 28A:
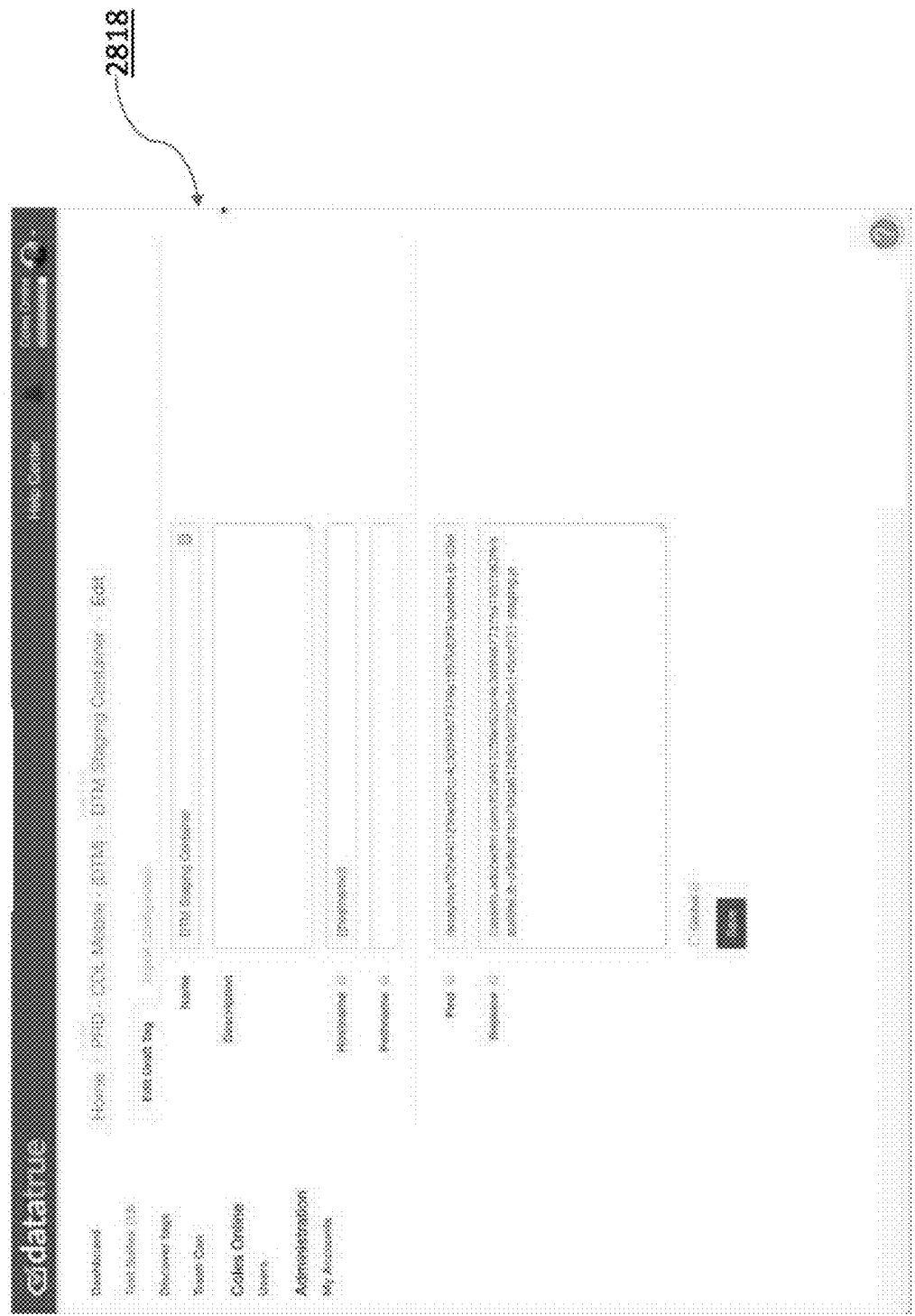
FIG. 28A shows the configuration of the proxy rewriter configuration used in the electronic system of FIG. 1.
Figure 29:
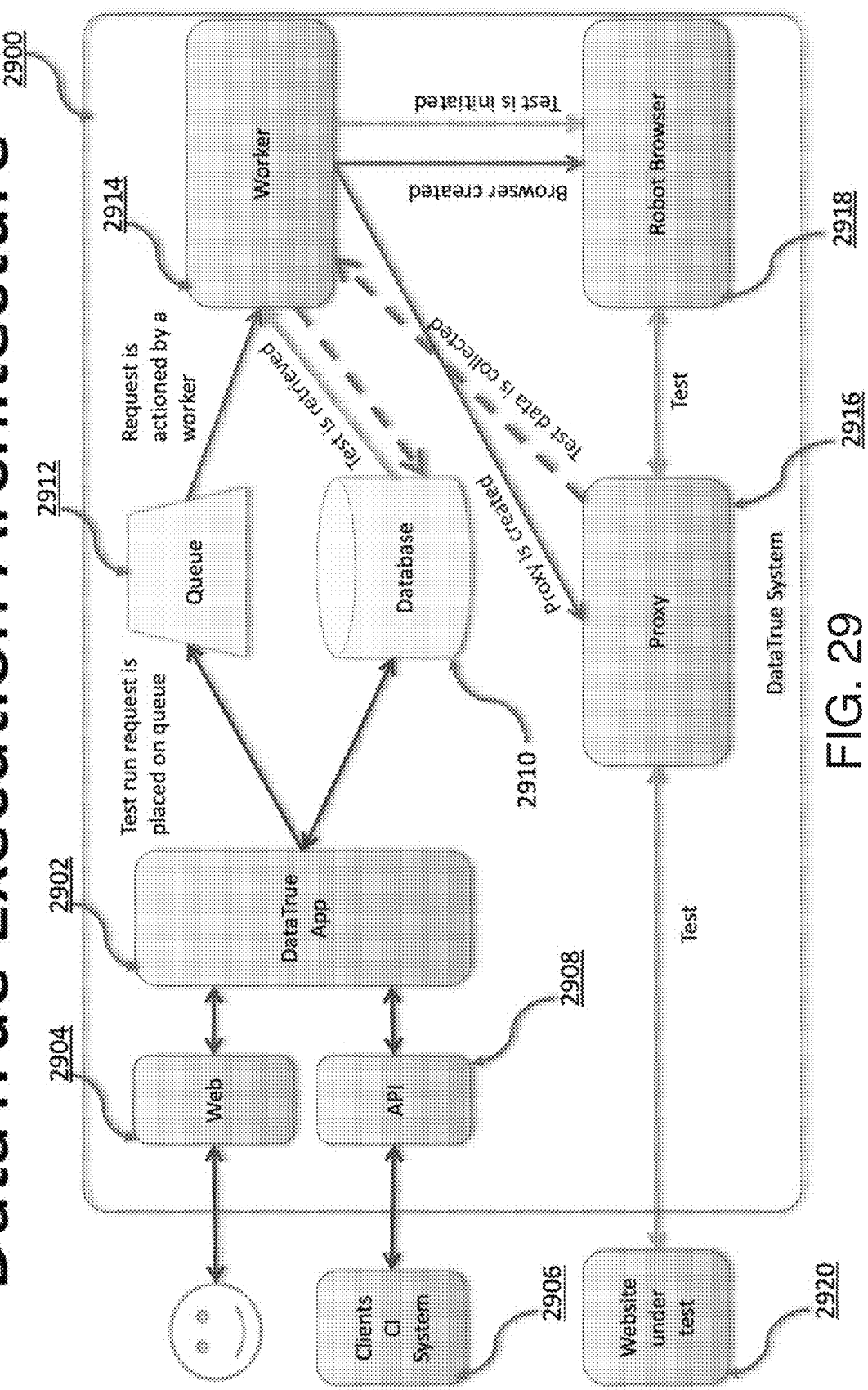
FIG. 29 shows the execution architecture used in the electronic system of FIG. 1.

Referring to FIG. 28, there is illustrated a number of different ways that the user of the user computer 102 can choose to facilitate the running of a test (scenario) 2708 at FIG. 27. Firstly, the user of the user computer 102 can perform an ad hoc test, within a selected a test suite 2800. The user of the user computer 102 runs the test suite 2802 and is able to review the results of the test 2804. Alternatively, the user of the user computer 102 can perform an ad hoc test run with a proxy rewriter for a selected test suite 2606. The proxy rewriter 2818 (see FIG. 28A) allows a user to alter the code associated with a tag for the duration of a test. By altering the code of a tag, the user is able to run the test against an unpublished version of the tag. The user can use this method to detect problems with tags before they are published to a website. The proxy rewriter forms part of the proxy module as shown in FIG. 29. The user of the user computer 102 selects the proxy rewriter and runs the test suite 2808. The user of the user computer 102 and can also review the results of the test 2810. A further variation is where the user of the user computer 102 can perform a scheduled test as set up by a test scheduler 2812. The test scheduler 2812 runs the test suite 2814 and alerts the user of the user computer or other nominated persons of any failures identified on the tested webpage, by email 2816.

There are a number of test execution algorithms (not shown) that support the running of test (scenarios) 2708 as detailed above in order to reduce the incidence of false negatives generated in running the test (scenarios) 2708. Firstly, for any tests (scenarios) 2708 that have not passed, the electronic system 100 will automatically rerun select tests as part of the execution of any of the test suites 2800, 2806 or 2812.

Another example test execution algorithm that may be included, is one that uses the step interaction sequence that determines when to progress to the next step within a test. Page load performance can be affected by many different factors during testing, such as variations in network latency and server load. The presence of such issues can create false negatives in the test results 2804, 2810 and 2816, if the electronic system 100 fails to wait for the step to be completed.

For website analysis and improvement it is important that page load performance issues are not misidentified as errors in the design of the website. Another example test execution algorithm is an 'Ajax response wait', where the electronic system 100 can be configured to detect visual cues associated with Ajax based interactions, such as spinners and progress gauges on loading websites. This ensures that the step procession waits until these Ajax based interactions have completed their actions.

Referring to FIG. 29, there is illustrated an execution architecture of the electronic system 100 shown in the Figure as the DataTrue System 2900. The user of the user computer 102 interfaces with the DataTrue application 2902 via the internet (web) 2904. The DataTrue application 2902 also interfaces with the client's Continuous Integration (CI) system 2906 via an application program interface (API) 2908. The CI system allows for the integration of a test suite as part of the deployment of an electronic document such as a website. This results in the electronic system 100 automatically executing any of the test suites 2800, 2806 or 2812 on the new or modified electronic document such as a website, prior to it being made accessible.

Using the data gathered from 2906 and 102, the DataTrue application queries a database 2910 and obtains the information required to make a test run request, which is placed on a queue 2912. The test run request is actioned by a worker 2914 where a worker 2914 is a computer process whose task is to take a test that has been placed on the queue and run that test. There may be more than one worker 2914 and any available workers 2914 will remain idle until such time as there is at least one action on the queue 2912. The number of workers will scale up in proportion to the length of the queue 2912. In order to run the test the worker 2914 creates two child processes, a proxy module (proxy) 2916 and a browser process (robot browser) 2918. The worker controls these two child processes to run the test and collect the results of the test. The test criteria is retrieved from the database 2910 and the test initiated by the worker 2914 such that the robot browser 2918 and proxy 2916 are used to perform the tests on the website 2920. The proxy 2916 is used to monitor data passed between the robot browser 2918 and the website under test 2920. The robot browser reads in the steps 2606 set by the user of the user computer 102 in the test suite 2604 and uses them to control an automated browser that interacts with the website 2920. The proxy 2916 specifically collects the data generated by the tags implemented on the website under test 2920. This allows for real time modifications to the made to the website 2920 during testing and for multiple test (scenarios) with different tag configurations to be run with ease.

Tag configurations are monitored by the validator component (not shown). The validator is a separate process that runs concurrently with the simulator and monitors the data generated by the robot browser 2918 as it undertakes the steps 2606 set by the user of the user computer 102 in the test suite 2604. The validator uses a tag definition library that contains a collection of data indicators that are used to recognise data generated by specific tags. The validator is synchronised with the robot browser 2918, such that when the robot browser 2918 performs a step, the validator retrieves the tag information from the database 2910 associated with that step. The validator then detects additional information about the tag and attempts to determine its validity in respect to the information retrieved from the database. For example, when a user of a website adds a product to their cart, the validator will verify that the correct product information is passed to the analytics system upon the item entering the cart. Once the test is complete, the test data is collected by the worker 2914 and stored in the database 2910.

The stored test data reflects the range of test (scenarios) 2808 that can be performed on at least an electronic document 100, such as a website. This test data is important for website analytics and ensuring appropriate tag configuration. The test (scenarios) 2808 are completely determined by the user of the user computer 102 and as such are highly customisable. The electronic documentation feature (not shown) in the electronic system 100 interprets the customised configuration information embedded in the test (scenarios) 2808 and generates a document that provides a detailed description of the test data. This generated document can be downloadable and may come in a number of formats, such as Portable Document Format (PDF) or an Excel spreadsheet.

Advantages

Figure 11:
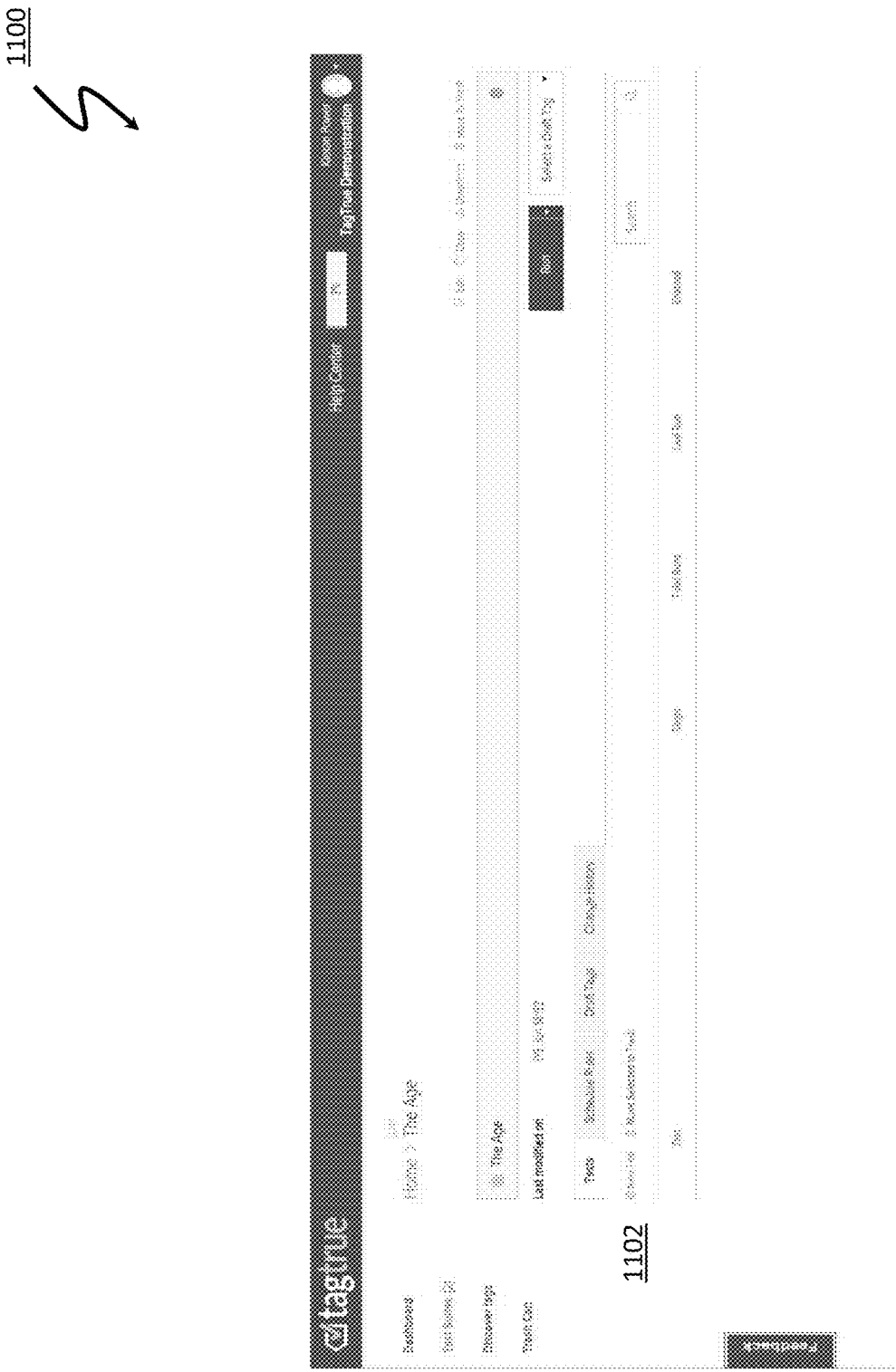
FIG. 11 shows a specific test suite webpage used in the electronic system of FIG. 1.

One of the advantages of the embodiments shown with reference to system 100 is that it allows the user of the user computer 102 to quickly and efficiently develop specific tests 812 to 818. Referring to FIG. 11, to create a new test the user simply uses the mouse of the user computer 102 to first click on the test suite 502 and 504 (see FIG. 5) to which they want to add the new test. For the sake of this description assume the user clicks on the test suite 504 entitled "The Age". As described previously, the result of clicking on the desired test suite 504 is that the user is presented with the relevant test list webpage 1100, which in the case of FIG. 11 show the list of tests related to The Age test suite. In the case of FIG. 11 there are no established tests for The Age test suite. To create a test for The Age test suite the user of the user computer 102 can click of the New Test option 1102 of The Age test list webpage 1100. When the user clicks on the New Test option 1102 the user computer 102 sends data to the application server 104 via the data links 110a and 110b and the data network 108 indicating that the New Test option 1102 has been clicked. In response to receiving this data from the user computer 102 the application server 104 generates a test build webpage 1200 (see FIG. 1200) and sends it to the user computer 102 via the data links 110a and 110b and the data network 108. On receiving the test build webpage 1200 the user computer 102 renders the webpage 1200 on the screen of the user computer 102 so the user can view the webpage 1200.

Variations

Although not required, the embodiments described with reference to the figures can be implemented in part or in full via an application programming interface (API), an application development kit (ADK) or as a series of libraries, for use by a developer, for the creation of software applications which are to be used on any one or more computing platforms or devices, such as a terminal or personal computer operating system or a portable computing device, or within a larger server structure, such as a 'data farm' or within a larger transaction processing system.

Generally, as program modules include routines, programs, objects, components and data files that perform or assist in the performance of particular functions, it will be understood that the functionality of the software application may be distributed across a number of routines, programs, objects or components to achieve the same functionality as the embodiment and the broader invention claimed herein. Such variations and modifications are within the purview of those skilled in the art.

It will also be appreciated that where methods and systems of the present invention and/or embodiments are implemented by computing systems or partly implemented by computing systems then any appropriate computing system architecture may be utilised. This includes standalone computers, network computers and dedicated computing devices (such as field-programmable gate arrays).

Where the terms "computer", "computing system" and "computing device" are used in the specification, these terms are intended to cover any appropriate arrangement of computer hardware for implementing the inventive concept and/or embodiments described herein.

The invention claimed is:

1. An electronic system comprising a processing arrangement that includes at least a user computer and memory, and an application server and memory, the electronic system being capable of accessing:

document test data relating to an ability to collect website tag data and facilitate sending the website tag data via a data network to a data server that is remote from the electronic system; and an electronic document hosted by a web server, wherein the user computer creates a tag test document; and creates a graphical user interface on the user computer that allows a user to create the document test data by graphically interacting with the tag test document, receives the document test data, provides the document test data to a web server, which contains the electronic document, receives result data from the web server, and utilizes the result data to make a determination in relation to whether the electronic document has the ability to collect website tag data and facilitate sending the website tag data via the data network to the data server that is remote from the electronic system.

2. The electronic system as claimed in claim 1, wherein the at least one document characteristic comprises a reference to at least one other electronic document.

3. The electronic system as claimed in claim 2, wherein the user computer is capable of generating an electronic report about the determination in relation to whether the electronic document has the ability to collect the website tag data and facilitate sending the website tag data via the data network to the data server that is remote from the electronic system.

4. The electronic system as claimed in claim 3, wherein user computer is capable of further accessing schedule data that defines a schedule for processing the document test data.

5. The electronic system as claimed in claim 4, wherein the user interface is arranged to allow the user to input the schedule data.

6. The electronic system as claimed in claim 5, wherein the user computer is capable of generating an electronic report about the determination as to whether the electronic document has the ability to collect website tag data.

7. A method for accessing document test data that defines an ability of an electronic document to collect website tag data and facilitate sending the website tag data via a data network to a data server that is remote to the electronic system, the method including the steps of, with a processing arrangement:

creating a tag test document; and creating a graphical user interface on a user computer that allows a user to create the document test data by graphically interacting with the tag test document; and receiving the document test data from the user computer;

providing the document test data to a web server which contains the electronic document;

receiving result data from the web server; and utilizing the result data to make a determination in relation to whether the electronic document has the ability to collect website tag data and facilitate sending the website tag data via a data network to a data server that is remote to the electronic system.

8. The method as claimed in claim 7, wherein said ability comprises a reference to at least one other electronic document.

9. The method as claimed in claim 7, wherein the method further comprises the additional step of the processing arrangement generating an electronic report about the determination in relation to whether the electronic document has the ability to collect website tag data and facilitate sending the website tag data via a data network to a data server that is remote to the electronic system.

10. The method as claimed in claim 7, wherein the method further comprises the step of the processing arrangement accessing schedule data that defines a schedule for processing the document test data.

11. The method as claimed in claim 10, wherein the user interface is arranged to allow the user to input the schedule data.

12. The method as claimed in claim 7, wherein the method further comprises the step of the processing arrangement generating an electronic report about the determination as to whether the electronic document has the ability to collect website tag data.

13. The method as claimed in claim 7, wherein the method further comprises the step of the processing arrangement retrieving the electronic document via a data network from a computer server that is remote to the electronic system.

* * * * *